(12) United States Patent
Roth et al.

(10) Patent No.: US 12,433,959 B2
(45) Date of Patent: Oct. 7, 2025

(54) INJECTABLE HYDROGELS FOR CONTROLLED RELEASE OF IMMUNOMODULATORY COMPOUNDS

(71) Applicant: THE BOARD OF TRUSTEES OF THE LELAND STANFORD JUNIOR UNIVERSITY, Stanford, CA (US)

(72) Inventors: Gillie A. Roth, Stanford, CA (US); Eric Andrew Appel, Stanford, CA (US); Mark Davis, Stanford, CA (US); Emily C. Gale, Stanford, CA (US); Santiago Correa, Stanford, CA (US)

(73) Assignee: THE BOARD OF TRUSTEES OF THE LELAND STANFORD JUNIOR UNIVERSITY, Stanford, CA (US)

(*) Notice: Subject to any disclaimer, the term of this patent is extended or adjusted under 35 U.S.C. 154(b) by 1089 days.

(21) Appl. No.: 17/281,014

(22) PCT Filed: Oct. 1, 2019

(86) PCT No.: PCT/US2019/054070
§ 371 (c)(1),
(2) Date: Mar. 29, 2021

(87) PCT Pub. No.: WO2020/072495
PCT Pub. Date: Apr. 9, 2020

(65) Prior Publication Data
US 2021/0338801 A1 Nov. 4, 2021

Related U.S. Application Data

(60) Provisional application No. 62/739,587, filed on Oct. 1, 2018.

(51) Int. Cl.
*A61K 9/06* (2006.01)
*A61K 9/00* (2006.01)
*A61K 9/51* (2006.01)
*A61K 39/015* (2006.01)
*A61K 39/145* (2006.01)
*A61K 39/21* (2006.01)
*A61K 39/39* (2006.01)
*A61K 45/00* (2006.01)
*A61K 47/38* (2006.01)
*A61K 47/69* (2017.01)
*A61P 31/16* (2006.01)
*A61P 35/00* (2006.01)
*A61K 39/00* (2006.01)

(52) U.S. Cl.
CPC ............ *A61K 47/6937* (2017.08); *A61K 9/06* (2013.01); *A61K 39/015* (2013.01); *A61K 39/145* (2013.01); *A61K 39/21* (2013.01); *A61K 39/39* (2013.01); *A61P 31/16* (2018.01); *A61P 35/00* (2018.01); *A61K 2039/54* (2013.01); *A61K 2039/55577* (2013.01); *A61K 2039/55588* (2013.01); *A61K 2039/6093* (2013.01)

(58) Field of Classification Search
CPC .. A61K 47/6937; A61K 39/39; A61K 9/5146; A61K 47/38; A61P 31/16
See application file for complete search history.

(56) References Cited

U.S. PATENT DOCUMENTS

| | | |
|---|---|---|
| 4,192,727 A | 3/1980 | Ward |
| 5,143,724 A | 9/1992 | Leshchiner et al. |
| 5,410,016 A | 4/1995 | Hubbell et al. |
| 5,480,436 A | 1/1996 | Bakker et al. |
| 5,785,993 A | 7/1998 | Baker et al. |
| 5,888,988 A | 3/1999 | Elson |
| 6,150,581 A | 11/2000 | Jiang et al. |
| 6,673,093 B1 | 1/2004 | Sawhney |
| 6,818,018 B1 | 11/2004 | Sawhney |
| 7,125,860 B1 | 10/2006 | Renier et al. |
| 7,347,850 B2 | 3/2008 | Sawhney |
| 8,455,001 B2 | 6/2013 | Ito et al. |
| 8,709,450 B2 | 4/2014 | Kaneko et al. |
| 8,728,524 B2 | 5/2014 | Bellini et al. |
| 8,748,409 B2 | 6/2014 | Kaneko et al. |

(Continued)

FOREIGN PATENT DOCUMENTS

| | | |
|---|---|---|
| EP | 2511336 B1 | 10/2012 |
| KR | 20060011503 A | 2/2006 |

(Continued)

OTHER PUBLICATIONS

Goff, Peter H., et al. "Synthetic Toll-like receptor 4 (TLR4) and TLR7 ligands as influenza virus vaccine adjuvants induce rapid, sustained, and broadly protective responses." Journal of Virology 89.6 (2015): 3221-3235. (Year: 2015).*
Krammer, Florian, et al. "A carboxy-terminal trimerization domain stabilizes conformational epitopes on the stalk domain of soluble recombinant hemagglutinin substrates." (2012): e43603. (Year: 2012).*
CDC, Vaccines and the Diseases they Prevent, obtained online at: https://www.cdc.gov/vaccines/by-disease/index.html, downloaded on Feb. 12, 2025. (Year: 2024).*
Memorial Sloan Kettering Cancer Center, Cancer vaccines: The Types, How They Work, and Which Cancers They Treat, obtained online at: https://www.mskcc.org/cancer-care/diagnosis-treatment/cancer-treatments/immunotherapy/cancer-vaccines, downloaded on Feb. 12, 2025. (Year: 2025).*
Leukemia & Lymphoma Society, Vaccine Therapy, downloaded at https://www.lls.org/treatment/types-treatment/vaccine-therapy, downloaded on Feb. 12, 2025. (Year: 2025).*

(Continued)

*Primary Examiner* — Abigail Vanhorn
(74) *Attorney, Agent, or Firm* — Kilpatrick Townsend & Stockton LLP

(57) ABSTRACT

An immunomodulatory delivery system includes a hydrogel, a first immunomodulatory cargo encapsulated in the cargo, and a second immunomodulatory cargo encapsulated in the hydrogel. The hydrogel includes a polymer non-covalently crossed-linked with a plurality of nanoparticles. The first immunomodulatory cargo is smaller than the second immunomodulatory cargo. A ratio of a diffusivity of the first immunomodulatory cargo through the hydrogel to a diffusivity of the second immunomodulatory cargo through the hydrogel is less than 3.

28 Claims, 16 Drawing Sheets

(56) References Cited

U.S. PATENT DOCUMENTS

Figure 1:
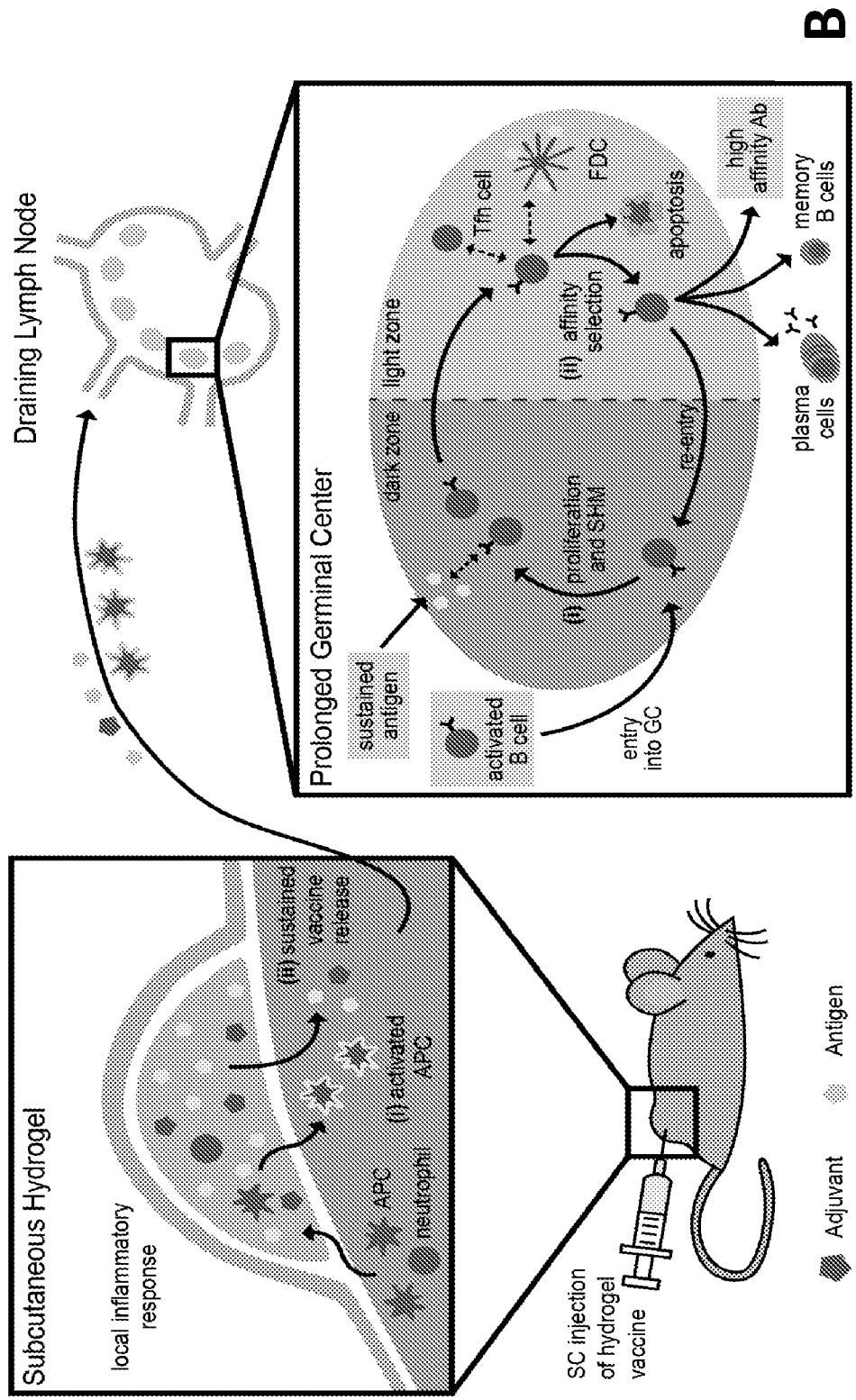

| | | | |
|---|---|---|---|
| 8,778,326 | B2 | 7/2014 | Lu et al. |
| 8,859,523 | B2 | 10/2014 | Prestwich et al. |
| 8,916,143 | B2 | 12/2014 | Putnam et al. |
| 9,089,730 | B2 | 7/2015 | Shalev et al. |
| 9,289,279 | B2 | 3/2016 | Wilson et al. |
| 10,590,257 | B2 | 3/2020 | Appel et al. |
| 11,045,429 | B2 * | 6/2021 | Appel ............... A61K 47/38 |
| 11,517,538 | B2 * | 12/2022 | Appel ............... A61K 47/36 |
| 2003/0180251 | A1 | 9/2003 | Friedrich et al. |
| 2004/0023842 | A1 | 2/2004 | Pathak et al. |
| 2005/0271727 | A1 | 12/2005 | Yao |
| 2006/0177481 | A1 | 8/2006 | Sawhney |
| 2007/0001156 | A1 | 1/2007 | Toreki |
| 2008/0069857 | A1 | 3/2008 | Yeo et al. |
| 2008/0107703 | A1 | 5/2008 | Tabata et al. |
| 2009/0294049 | A1 | 12/2009 | Udipi et al. |
| 2010/0285113 | A1 | 11/2010 | Shoichet et al. |
| 2010/0291055 | A1 | 11/2010 | Athanasiadis et al. |
| 2011/0178184 | A1 | 7/2011 | Kaneko et al. |
| 2012/0298777 | A1 | 11/2012 | Holladay et al. |
| 2015/0110772 | A1 | 4/2015 | Scherman et al. |
| 2015/0202299 | A1 | 7/2015 | Burdick et al. |
| 2016/0030789 | A1 | 2/2016 | Cordani |
| 2016/0228601 | A1 | 8/2016 | He et al. |
| 2016/0287745 | A1 | 10/2016 | Grinstaff et al. |
| 2017/0196818 | A1 | 7/2017 | Shin et al. |
| 2017/0319506 | A1 * | 11/2017 | Appel ............... A61K 9/5161 |
| 2017/0362380 | A1 | 12/2017 | Christman et al. |
| 2018/0110772 | A1 | 4/2018 | Govindan et al. |
| 2018/0280586 | A1 | 10/2018 | Appel et al. |
| 2020/0109253 | A1 | 4/2020 | Appel et al. |
| 2020/0164113 | A1 | 5/2020 | Appel et al. |
| 2023/0398061 | A1 * | 12/2023 | Grosskopf ............... A61P 35/00 |
| 2024/0299532 | A1 * | 9/2024 | Appel ............... A61K 39/215 |

FOREIGN PATENT DOCUMENTS

| | | |
|---|---|---|
| KR | 20170110882 A | 10/2017 |
| WO | WO93/017669 A1 | 9/1993 |
| WO | WO03/084481 A2 | 10/2003 |
| WO | WO2005/110377 A1 | 11/2005 |
| WO | WO2013/076305 A1 | 5/2013 |
| WO | WO2013/124654 A1 | 8/2013 |
| WO | WO2014/116187 A1 | 7/2014 |
| WO | WO2014/125418 A1 | 8/2014 |
| WO | 2014/039012 A1 | 3/2015 |
| WO | 2015/066535 A1 | 5/2015 |
| WO | WO2015/172073 A1 | 11/2015 |
| WO | WO2016/049360 A1 | 3/2016 |
| WO | 2018/078620 A1 | 5/2018 |
| WO | 2020/072495 A1 | 4/2020 |

OTHER PUBLICATIONS

Reid, The importance of Temperature and Viscosity, obtained online at: https://blog.rheosense.com/temperature-and-viscosity, downloaded on Feb. 12, 2025. (Year: 2021).*

Appel et al.; Activation energies control the macroscopic properties of physically cross-linked materials; Angew. Chem. Ind. Ed.; 53; 7 pgs.; Sep. 15, 2014.

Appel et al.; Exploiting electrostatic interactions in polymer-nanoparticle hydrogels; ACS Macro letters; 4(8); pp. 848-852; Jul. 27, 2015.

Appel et al.; Formation of single-chain polymer nanoparticles in water through host-guest interactions; Angew. Chem. Int. Ed.; 51; pp. 4185-4189; Apr. 23, 2012.

Appel et al.; Gluing Gels: A nanoparticle solution; Nature Materials; 13(3); pp. 231-232; Mar. 2014.

Appel et al.; High-water-content hydrogels from renewable resources through host-guest interactions; J. Am. Chem. Soc.; 134(28); pp. 11767-11773; Jul. 18, 2012.

Appel et al.; Self-assembled hydrogels utilizing polymer-nanoparticle interactions; Nature Communications; 6; pp. 6295; doi:10:1038/ncomms7295; 19 pages; (Author Manuscript); Feb. 19, 2015.

Appel et al.; Supramolecular cross-linked metworks via host-guest complexation with cucurbit[8] uril; Journal of the American Chemical Society: 132(40); pp. 14251-14260; Sep. 16, 2010.

Appel et al.; Supramolecular polymeric hydrogels; Chemical Society Reviews; 41(18); pp. 6195-6214; Sep. 2012.

Appel et al.; Sustained release of proteins from high water content supramolecular polymer hydrogels; Biomaterials; 33(18); pp. 4646-4652; Jun. 1, 2012.

Appel et al.; The control of cargo release from physically cross-linked hydrogels by crosslink dynamics; Biomaterials; 35(37); pp. 9897-9903; Dec. 1, 2014.

Artivashist et al.; Hydrogels: Smart materials for drug delivery; Oriental Journal of Chemistry; 29(3); pp. 861-870; Nov. 5, 2013.

Bang et al.; Injectable pullulan hydrogel for the prevention of postoperative tissue adhesion; International Journal of Biological Macromolecules; 87; pp. 155-162; Jun. 2016.

Bao et al.; Swelling behaviors of organic/inorganic composites based on various cellulose derivatives and inorganic particles; Carbohydrate Polymers; 88(2); pp. 589-595; Apr. 2012.

Bremer et al.; Laboratory scale clean-in-place (CIP) studies on the effectiveness of different caustic and acid wash steps on the removal of dairy biofilms; Intl. J. of Food Microb.; 106(3); pp. 254-262; Feb. 15, 2006.

Bourges et al.; Synthesis and General Properties of Silated-Hydroxypropyl Methylcellulose in Prospect of Biomedical Use; Advances in Colloid and Interface Science; 99 (3), pp. 215-228; Dec. 2, 2002.

Chen et al.; Injectable thermosensitive hydrogel containing hyaluronic acid and chitosan as barrier for prevention of postoperative peritoneal adhesion; Carbohydr. Polm.; 173; pp. 721-731; doi:10.1016/j.carbpol.2017.06.019; Oct. 2017.

Drevelle et al.; Thermal and fire behaviour of ammonium polyphosphate/acrylic coated cotton/PESFR fabric; Polymer Degradation and Stability; 88(1); pp. 130-137; Apr. 1, 2005.

Ehrbar et al.; Drug-sensing hydrogels for the inducible release of biopharmaceuticals; Nature materials; 7(10); pp. 800-804; Oct. 2008.

Evans et al.; Investigation into the transportation and melting of thick ice slurries in pipes; Intl. Journal of Refrig.; 31(1); pp. 145-151; Jan. 1, 2008.

Fu et al.; Biodegradable and thermosensitive monomethoxy poly-(ethylene glycol)-poly(lactic acid) hydrogel as a barrier for prevention of post-operative abdominal adhesion; journal of Biomedical Nanotechnology; 10(3); pp. 427-435; Mar. 2014.

Gesan-Guiziou et al.; Nanofiltration for the recovery of caustic cleaning-in-place solutions: robustness towards large variations of composition; Journal of Dairy Research; 69(4); pp. 633-643; Nov. 2002.

Gimenez et al.; Long-term forest fire retardants: a review of quality, effectiveness, application and environmental considerations; Intl. J. of Wildland Fire; 13(1); pp. 1-15; Apr. 27, 2004.

Grosskopf et al.; Injectable supramolecular polymer-nanoparticle hydrogels enhance human mesenchhymal stem cell delivery; Bioengineering & Translational Medicine, vol. 810147; pp. 1-11; Oct. 12, 2019.

Gu et al.; Study on preparation and fire-retardant mechanism analysis of intumescent flame-retardant coatings; Surface and coatings tech.; 201(18); pp. 7835-7841; Jun. 25, 2007.

Hales et al.; Ice fraction measurement of ice slurries through electromagnetic attenuation; Intl. J. of Refrig.; 47; pp. 98-104; Nov. 1, 2014.

Harada et al.; Macroscopic self-assembly through molecular recognition; Nature Chem.; 3(1); pp. 34-37; Jan. 2011.

Hoare et al.; Prevention of peritoneal adhesions using polymeric rheological blends; Acta Biomaterialia; 10(3); pp. 1187-1193; 16 pages; (Author Manuscript); Mar. 2014.

Hu et al.; Detection of poly- and perfluoroalkyl substances (PFASs) in U.S. drinking water linked to industrial sites, military fire training areas, and wastewater treatment plants; Env. Sci. and Tech. Letters; 3(10); pp. 344-350; Aug. 9, 2016.

(56) References Cited

OTHER PUBLICATIONS

Ishiyama et al.; The prevention of peritendinous adhesions by phospholipid polymer hydrogel formed in situ by spontaneous intermolecular interactions; Biomaterials; 31(14); pp. 4009-4016; May 2010.

Kapsabelis et al.; Adsorption of ethyl (hydroxyethyl) cellulose onto silica particles: the role of surface chemistry and temperature; J. of colloid and interface sci.; 228(2); pp. 297-305; Aug. 15, 2000.

Karacam et al.; Prevention of pleural adhesions using a membrane containing polyethylene glycol in rats; International Journal of Medical Sciences; 8(5); pp. 380-386; (year of pub. sufficiently earlier than effective US filing date and any foreign priority date); 2011.

Krielen et al.; In-hospital costs of an admission for adhesive small bowel obstruction; World Journal of Emergency Surgery; 11(1); pp. 49; DOI 10.1186/s13017-016-0109-y; 8 pages; Dec. 2016.

Krishna et al.; Protein- and oeptide-modified synthetic polymeric biomaterials; Peptide Science: Original Res. On Biomolecules; 94(1); pp. 32-48; Jan. 20, 2010.

Lu et al.; Injectable shear-thinning hydrogels engineered with a self-assembled dock-and-lock mechanism; Biomaterials; 33(7); pp. 2145-2153; Mar. 2012.

Maupin et al.; Estimated use of water in the United States in 2010; USGS Survey (No. 1405); 64 pgs.; (year of pub. sufficiently earlier than effective US filing date and any foreign priority date) 2014.

Merin et al.; Cleaning-in-place in the dairy industry: criteria for reuse of caustic (NaOH) solutions, Le Lait; 82(3); pp. 357-366; May 1, 2002.

Moody et al.; Monitoring perfluorinated surfactants in biota and surface water samples following an accidental release of fire-fighting foam into Etobicoke Creek; Environ. Sci. and Tech.; 36(4); pp. 545-551; Feb. 15, 2002.

Moody et al.; Occurrence and persistence of perfluorooctanesulfonate and other perfluorinated surfactants in groundwater at a fire-training area at Wurtsmith Air Force Base, Michigan, USA; J. Environ. Mon.; 5(2); pp. 341-345; Mar. 10, 2003.

Moody et al.; Perfluorinated surfactants and the environmental implications of their use in fire-fighting foams; Environ. Sci. and Technol.; 34(18); pp. 3864-3870; Sep. 15, 2000.

Mulyasasmita et al.; Molecular-level engineering of protein physical hydrogels for predictive sol-gel phase behavior; Biomacromolecules; 12(10); pp. 3406-3411; Sep. 2, 2011.

Nakahata et al.; Redox-responsive self-healing materials formed from host-guest polymers; Nature Comm.; 2(511); pp. 1-6; Oct. 25, 2011.

Okabayashi et al; Adhesions after abdominal surgery: a systematic review of the incidence, distribution and severity; Surgery Today; 44(3); pp. 405-420; Mar. 1, 2014.

Osada et al.; The effect of cross-linked hyaluronate hydrogel on the reduction of post-surgical adhesion reformation in rabbits; Journal of International Medical Research; 5; pp. 233-241; Sep. 1999.

Parisi-Amon et al; Protein-engineered injectable hydrogel to improve retention of transplanted adipose-derived stem cells; Advanced Healthcare Materials: 2(3); pp. 428-432; 10 pages; (Author Manuscript); Mar. 2013.

Park et al.; In situ supramolecular assembly and modular modification of hyaluronic acid hydrogels for 3D cellular engineering; ACS Nano; 6(4); pp. 2960-2968; Mar. 15, 2012.

Patterson et al.; In situ characterization of the degradation of PLGA microspheres in hyaluronic acid hydrogels by optical coherence tomography; IEEE Transactions on Medical Imaging, vol. 28; pp. 74-81; Jan. 2009.

Petka et al.; Reversible hydrogels from self-assembling artifical proteins; Science; 281(5375); pp. 389-392; Jul. 17, 1998.

Pritchard et al.; An injectable thiol-acrylate poly(ethylene glycol) hydrogel for sustained release of methylprenisolone sodium succinate; Biomaterials; 32(2); pp. 587-597; 30 pages; (Author Manuscript); Jan. 2011.

Quarini; Ice-pigging to reduce and remove fouling and to achieve clean-in-place; Applied thermal Eng.: 22(7); pp. 747-753; May 1, 2002.

Quarini et al.; Investigation and development of an innovative pigging technique for the water-supply industry; Proc. Inst. Mech. Eng., Part E: J. Proc. Mech. Eng.; 224(2); pp. 79-89; May 1, 2010.

Rodell et al.; Rational design of network properties in guest-host assembled and shear-thinning hyaluronic acid hydrogels; Biomacromolecules; 14(11); pp. 4125-4134; 20 pages; (Author Manuscript); Oct. 14, 2013.

Rodell et al.; Shear-thinning supramolecular hydrogels with secondary autonomous covalent crosslinking to modulate viscoelastic properties in vivo; Adv. Functional Mat.; 25(4); pp. 636-644; Jan. 28, 2015.

Rose et al.; Nanoparticle solutions as adhesives for gels and biological tissues; Nature; 505(7483); pp. 382-385; Jan. 16, 2014.

Rowland et al.; Dynamically crosslinked materials via recognition of amino acids by cucurbit [8] uril; J. Mat. Chem. B; 1(23); pp. 2904-2910; Apr. 30, 2013.

Salem et al.; Porous polymer and cell composites that self-assemble in situ, Advanced Materials; 15(3); pp. 210-213; Feb. 5, 2003.

Schroeder; Can fire suppressant geis protect log decks. A case study to test the concept; Wildland Fire Operations Research Group; Vancouver; (year of pub. sufficiently earlier than effective US filing date and any foreign priority date) 2005.

Schroeder; Can fire suppressant gels protect log decks? Part III—Two case studies to test gel effectiveness against radiant and convective heat transfer; Vancouver; (year of pub. sufficiently earlier than effective US filing date and any foreign priority date) 2006.

Schroeder; Effectiveness of forest fuel management: a crown fire case study in the Northwest Territories, Canada; Forest Eng. Res. Inst. of Canada, Vancouver; (year of pub. sufficiently earlier than effective US filing date and any foreign priority date) 2006.

Shen et al.; Tuning the erosion rate of artifical protein hydrogels through control of network topology; Nature Materials; 5(2); pp. 153-158; Feb. 2006.

Shi et al.; Polymeric hydrogels for post-operative adhesion prevention: a review; Materials Express; 7(6); pp. 417-438; Dec. 2017.

Song et al.; Peritoneal adhesion prevention with a biogradable and injectable N, O-carboxymethyl chitosan-aldehyde hyaluronic acid hydrogel in a rat repeated injury model; Scientific Reports; 6; doi: 10.1038/srep37600; 13 pages; Nov. 21, 2016.

Stapleton et al.; A novel, shear-assembling shear-thinning polymer-nanoparticle hydrogel diminishes post-operative thoracic adhesion in a podent model of ischemic cardiomyopathy; Circulation; 136(1); Abstract 21311; 6 pages; (Abstract Only); Jun. 9, 2018.

Tamesue et al.; Linear versus dendritic molecular binders for hydrogel network formation with clay nanosheets: studies with ABA triblock copolyethers carrying guanidinium ion pendants; J. Am. Chem. Soc.; 135 (41); pp. 15650-15655; Oct. 3, 2013.

Wang et al.; High-water-content mouldable hydrogels by mixing clay and a dendritic molecular binder; Natue 463(7279); pp. 339-343; Jan. 21, 2010.

Wang et al.; PLGA-chitosan/PLGA-alginate nanoparticle blends as biodegradable colloidal gels for seeding human umbilical cord mesenchymal stem cells; Journal of Bionedical Research, Part A; 96(3); pp. 520-527; (Author Manuscript) Mar. 2011.

Webber et al.; Supramolecular biomaterials; Nature Materials; 15(1); pp. 13-26; Jan. 2016.

Wong Po Foo et al.; Two-component protein-engineered physical hydrogels for cell encapsulation; Proceedings of the National Academy of Sciences; 106(52); pp. 22067-22072; doi: 10.1073/pnas.0904851106; 6 pages; Dec. 29, 2009.

Yamaguchi et al.; Photoswitchable gel assembly based on molecular recognition; Nature Comm.; 3(603); pp. 1-5; Jan. 3, 2012.

Yamaguchi et al.; Self-assembly of gels through molecular recognition of cyclodextrins: Shape selectivity for linear and cyclic guest molecules; Macromolecules; 44(8); pp. 2395-2399; Mar. 25, 2011.

Yang et al.; A postoperative anti-adhesion barrier based on photoinduced imine-crosslinking hydrogel with tissue-adhesive ability; Acta Biomaterialia; 62; pp. 199-209; Oct. 15, 2017.

(56) References Cited

OTHER PUBLICATIONS

Yeo et al.; Polymers in the prevention of peritoneal adhesions; European Journal of Pharaceutics and Biopharmaceutics; 68(1); pp. 57-66; 16 pages; (Author Manuscript); Jan. 2008.
Yu et al.; Comparative studies of thermogels in preventing post-operative adhesions and corresponding mechanisms; Biomater. Sci.; 2(8); pp. 1100-1109; doi: 10.1039/C4M00029C; retrived from the internet (http://pubs.rso.org/-/content/articlehtml/2014/bm/c4bm00029c); 30 pages; (year of pub. sufficiently earlier than effective US filing date and any foreign priority date) 2014.
Zhang et al.; Biodegradable and thermoreversible PCLA-PEG-PCLA hydrogel as a barrier for prevention of post-operative adhesion; Biomaterials; 32(21); pp. 4725-4736; Jul. 2011.
Zhu et al.; Metal and light free "click" hydrogels for prevention of post-operative peritoneal adhesions; Polymer Chemistry; 5(6); pp. 2018-2026; (year of pub. sufficiently earlier than effective US filing date and any foreign priority date) 2014.
Xu et al.; Genetically engineered block copolymers: influence of the length and structure of the coiled-coil blocks on hydrogel self-assembly; Pharm. Res.; 25(3); pp. 674-682; Mar. 1, 2008.
Xu et al.; Reversible hydrogels from self-assembling genetically engineered protein block copolymers; Biomacromolecules; 6(3); pp. 1739-1749; May 9, 2005.
Fan et al.; Injectable hydrogels for localized cancer therapy; Frontiers in Chemistry; vol. 7;Article 675; doi: 10.3389/fchem.2019.00675; 1 1 pages; Oct. 2019.
Richards; Cancer immunotherapy gets assist from micro-scale engineering; 7 pages; retrieved from the internet (https://www.fredhutch.org/en/news/center-news/2019/12/stephan-thin-film-stent-immunotherapy.html) on Nov. 11, 2021.
Adusumilli et al.; Regional delivery of mesothelin-targeted car t cell therapy generates potent and long lasting cd4-dependent tumor immunity; Science Translational Medicine; 6(261); pp. 261ra151-261ra151; 31 pages; (Author Manuscript); Nov. 2014.
Anthony et al.; Scalable manufacturing of biomimetic moldable hydrogels for industrial applications; Porceedings National Academy Sciences; 113(50); pp. 14255-14260; Dec. 2016.
Cheung et al; Scaffolds that mimic antigen-presenting cells enable ex vivo expansion of primary t cells; Nature Biotechnology; 36(2); 160-169; 29 pages; (Author Manuscript); Feb. 2018.
Chu et al.; A bright cyan-excitable orange fluorescent protein facilitates dual-emission microscopy and enhances bioluminescence imaging in vivo; Nature Biotechnology; 34(7); pp. 760-767; 29 pages; (Author Manuscript); Jul. 2016.
Conlon et al.; Redistribution, hyperproliferation, activation of natural killer cells and CD8 T cells, and cytokine production during first-in-human clinical trail of recombinant human interleukin-15 in patients with cancer; Journal of Clinical Oncology; 33(1); pp. 74-82; Jan. 2015.
Duhen et al.; Co-expression of cd39 and cd103 identifies tumor-reactive cd8 t cells in human solid tumors; Nature Communications; 9(1); pp. 1-13; Jul. 2018.
Foster et al.; The diverse roles of hydrogel mechanics in injectable stem cell transplantation; Current Opinion Chemical Engineering: 15; pp. 15-23; 17 pages; (Author Manuscript); Feb. 2017.
Graham et al.; Allogeneic car-t cells: more than ease of access ?; Cell; 7 (10); pp. 155; doi: 10.3390/cells7100155; 11 pages; Oct. 2018.
Hall et al.; Engineered luciferase reporter from a deep sea shrimp utilizing a novel imidazopyrazinone substrate; ACS Chemical Bilogy; 7(11); pp. 1848-1857; Nov. 2012.

Hughes et al.; Transfer of a tor gene derived from a patient with marked antitumor response conveys highly active t-cell effector functions; Human Gene Therapy; 16(4): pp. 457-472; 25 pages; (Author Manuscript); Apr. 2005.
Labanieh et al.; Programming car-t-cells to kill cancer; Nature Biomedical Engineering; 2(6); pp. 377-391; (year of pub. sufficiently earlier than effective US filing date and any foreign priority date) 2018.
Long et al.; 4-1BB costimulation ameliorates t cell exhaustion induced by tonic signaling of chimeric antigen receptors; Nature Medicine; 21(6); pp. 581-590; 27 pages; (Auhtor Manuscript); Jun. 2015.
Lotze et al.; Clinical effects and toxicity of interleukin-2 in patients with cancer; Cancer; 58(12); pp. 2764-2772; Dec. 1986.
Majzner et al.; Car t cells targeting b7-h3, a pan-cancer antigen, demonstrate potent preclinical activity against pediatric solid tumors and brain tumors; Clinical Cancer Research; 25(8); pp. 2560-2574; Apr. 2019.
Miller et al.; A first-in-human phase 1 study of subcutaneous outpatient human 1L15 (rhIL15) in adult with advanced solid tumors; Clinical Cancer Research; 24(7); pp. 1525-1535; Apr. 2018.
Nair et al.; A simple practice guide for dose conversion between animals and human; Journal Basic Clinical Pharmacy; 7(2); pp. 27-31; Mar. 2016.
Ring et al.; Mechanistic and structural insight into the functional dichotomy between il-2 and il-15; Nature Immunology; 13(12); pp. 1187-1195; 26 pages; (Author Manuscript); Dec. 2012.
Shaner et al.; A bright monomeric green fluorescent protein derived from branchiostoma lanceolatum; Nature Methods; 10(5); pp. 407-409; 18 pages; (Author Manuscript); May 2013.
Smith et al.; Biopolymers codelivering engineered t cells and sting agonists can eliminate heterogeneous tumors; The Journal clinical Investigation; 127(6); pp. 2176-2191; Jun. 2017.
Sridhar et al.; Regional delivery of chimeric antigen receptor (car) t-cells for cancer therapy; Cancers; 9(7); pp. 92; 10 pages; doi:10.3390/cancers9070092; Jul. 2017.
Stapleton et al.; Use of a supramolecular polymeric hydrogel as an effective post-operative pericardial adhesion barrier; Nature Biomedical Engineering; 3(8); pp. 611-620; Aug. 2019.
Stephan et al.; Bipolymer implants enhance the efficacy of adoptive t-cell therapy; Nature Biotechnology; 33(1); pp. 97-101; 18 pages; (Author Manuscript); Jan. 2015.
Titov et al.; The biological basis and clinical symptoms of car-t therapy associated toxicites; Cell Death andd Disease; 9(9); pp. 1-15; Sep. 2018.
Waldmann et al.; Safety (toxicity), pharmacokinetics, immunogenicity, and impact on elements of the normal immune system of recombinant human il-15 in rhesus macaques; Blood; The Journal American Society Hermatology; 117(18); pp. 4787-4795; May 2011.
Walker et al.; Tumor antigen and receptor densities regulate efficacy of a chimeric antigen receptor targeting anaplastic lymphoma kinase; Molecular Therapy; 25(9); pp. 2189-2201; Sep. 2017.
Ou et al., "Broad and Durable Humoral Responses Following Single Hydrogel Immunization of SARS-CoV-2 Subunit Vaccine," Adv. Healthcare Matter 2023, 2301495, pp. 1-14.
European Patent Application No. 19869113.1, Extended European Search Report, Jun. 9, 2022, 7 pages.
International Patent Application No. PCT/US2019/054070, International Preliminary Report on Patentability, Mar. 23, 2021, 8 pages.
International Patent Application No. PCT/US2019/054070, International Search Report and Written Opinion of the International Searching Authority, Dec. 30, 2019, 11 pages.

\* cited by examiner

| Sample | Diffusivity (µm²/s) |
|---|---|
| Poly(I:C) in PBS* | 7.17 |
| OVA in PBS* | 76.6 |
| Poly(I:C) in 1:5 | 0.42 ± 0.08 |
| OVA in 1:5 | 1.44 ± 0.34 |
| HPMC-C$_{12}$ in 1:5 | 0.22 ± 0.03 |
| Poly(I:C) in 2:10 | 0.59 ± 0.03 |
| OVA in 2:10 | 0.80 ± 0.15 |
| HPMC-C$_{12}$ in 2:10 | 0.17 ± 0.02 |

*Calculated with Stokes-Einstein

FIG. 16

INJECTABLE HYDROGELS FOR CONTROLLED RELEASE OF IMMUNOMODULATORY COMPOUNDS

CROSS REFERENCE TO RELATED APPLICATIONS

This application claims priority to Provisional Application No. 62/739,587, titled "Injectable Hydrogels for Controlled Release of Immunomodulatory Compounds," filed Oct. 1, 2018, the entirety of which is incorporated by reference herein.

INCORPORATION BY REFERENCE

All publications and patent applications mentioned in this specification are herein incorporated by reference to the same extent as if each individual publication or patent application was specifically and individually indicated to be incorporated by reference.

BACKGROUND

Vaccines are among the most effective medical interventions in history. The eradication of smallpox, near eradication of poliomyelitis, and vast decreases in diphtheria, measles, and rubella are testaments to the ability of vaccines to transform disease burden worldwide. It is estimated that vaccines have prevented 103 million cases of disease in the United States since 1924, and save 2.5 million lives worldwide per year.

Innovations in vaccine design have the potential to improve current vaccines and pave the way for creating new vaccines. Traditional vaccine design is based on using attenuated or inactivated live viruses, which provide cues to the immune system to create an immune memory without causing illness in patients. These whole pathogen vaccines do not allow for targeted immune responses because they contain multiple antigens and innate immune-activating molecules. In contrast, subunit vaccines are composed of a purified antigen (often a protein) from the microorganism and an adjuvant to stimulate the immune system. These vaccines drive highly specific antigen targeting, and remove many of the safety challenges associated with using whole microorganisms. Subunit vaccines have become more widely used for infectious diseases, though they have limited ability to produce robust and persistent immune responses for many target diseases. The failure of subunit vaccines to elicit a sufficiently strong immune response likely arises, in part, from inappropriate temporal control over antigen presentation and adjuvant mediated activation. Natural infections expose the immune system to antigen and inflammatory signals for 1-2 weeks. Conversely, the short-term presentation of subunit vaccines from a single bolus administration persists for only 1-2 days. Recent work demonstrates that the kinetics of antigen presentation to the immune system dramatically influences the adaptive immune response. Previous biomaterial solutions for prolonged vaccine delivery have relied on polymer microparticles whose synthesis typically requires organic solvents that can denature biologic cargo. Further, vaccines and other immunotherapies are typically administered in a saline solution as a series of multiple shots in order to achieve appropriate responses. These are commonly combinations of multiple compounds that can differ greatly in molecular weight and/or chemical makeup, complicating their co-release.

Additionally, recent clinical successes have demonstrated that immunotherapy affords exceptional potential as a treatment strategy leading to complete eradication of primary tumors and metastases, yet patients exhibit highly variable responses. Combining multiple approaches engaging both innate and adaptive immune responses may improve response rates, and multi-agent immunotherapies are already in clinical testing. Molecular reagents such as adjuvants, cytokines and antigens range from peptides to antibodies to nucleic acids to lipopolysaccharides. To appropriately activate the immune response, these reagents must often be present in the same place at the same time; however, proper timing is extremely challenging or often impossible when the components differ in chemical nature.

Therefore, there is a significant need for the development of new materials that allow for the sustained exposure of vaccine and/or immunotherapy components, particularly of multiple compounds of various sizes, to the immune system.

SUMMARY OF THE DISCLOSURE

Described herein is an immunomodulatory delivery platform that increases the exposure time of immunomodulatory components to the immune system. The platform includes an injectable and self-healing polymer-nanoparticle (PNP) hydrogel to deliver the components of a subunit vaccine. The PNP hydrogel advantageously enhances the magnitude and duration of the humoral immune response compared to a standard bolus administration and can provide a local inflammatory niche as well as sustained release of the vaccine cargo. Together, these properties promote a prolonged germinal center response which enhance high affinity antibody production and humoral immune memory.

The PNP hydrogel described herein can encapsulate essentially any immunomodulatory cargo and co-release them over timeframes tunable from days to weeks to appropriately harness the immune system. The shear-thinning and self healing properties of the PNP hydrogel can enable delivery of the immunomodulatory cargo by injection and prolong exposure to the immune system to create a more robust immune response.

In general, in one embodiment, an immunomodulatory delivery system includes a hydrogel, a first immunomodulatory cargo encapsulated in the cargo, and a second immunomodulatory cargo encapsulated in the hydrogel. The hydrogel includes a polymer non-covalently crossed-linked with a plurality of nanoparticles. The first immunomodulatory cargo is smaller than the second immunomodulatory cargo. A ratio of a diffusivity of the first immunomodulatory cargo through the hydrogel to a diffusivity of the second immunomodulatory cargo through the hydrogel is less than 3.

This and other embodiments can include one or more of the following features. The ratio can be less than 2. The ratio can be less than 1.5.

In general, in one embodiment, an immunomodulatory delivery system includes a hydrogel, a first immunomodulatory cargo encapsulated in the cargo, and a second immunomodulatory cargo encapsulated in the hydrogel. The hydrogel includes a polymer non-covalently crossed-linked with a plurality of nanoparticles. The first immunomodulatory cargo is smaller than the second immunomodulatory cargo. A ratio of diffusivity of both the first immunomodulatory cargo and the second immunomodulatory cargo to a self-diffusivity of the hydrogel is less than 10.

This and other embodiments can include one or more of the following features. The ratio can be less than 6. The ratio can be less than 5. The ratio of diffusivity of the first immunomodulatory cargo to the self-diffusivity of the hydrogel can be greater than 2. The ratio of diffusivity of the first immunomodulatory cargo to the self-diffusivity of the hydrogel can be greater than 3.

Figure 3:
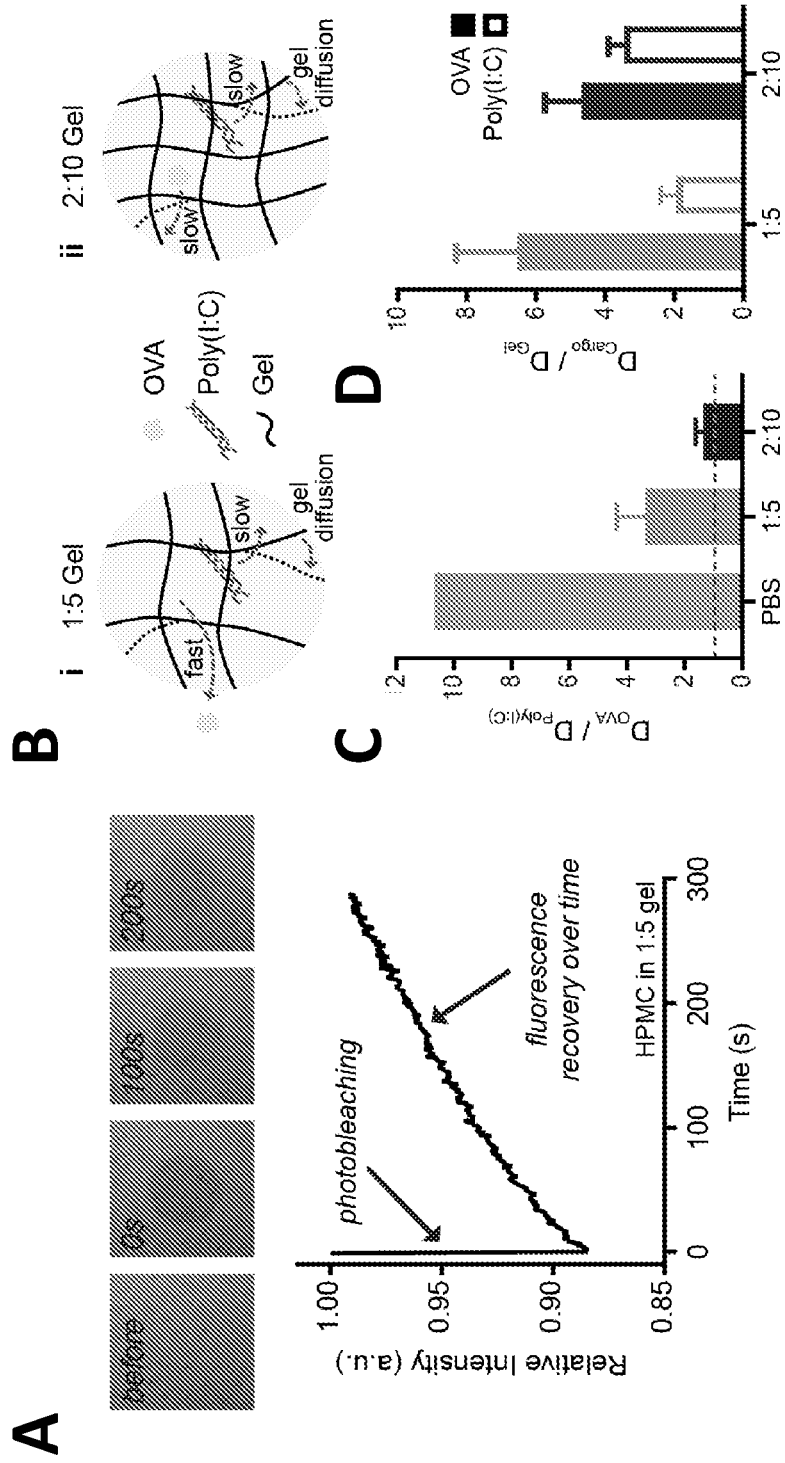

In general, in one embodiment, an immunomodulatory delivery system includes a hydrogel, a first immunomodulatory cargo encapsulated in the cargo, and a second immunomodulatory cargo encapsulated in the hydrogel. The hydrogel includes a polymer non-covalently crossed-linked with a plurality of nanoparticles. The hydrogel further includes greater than 1% polymer. The first immunomodulatory cargo is smaller than the second immunomodulatory cargo. The first and second immunomodulatory cargos are configured to be released from the hydrogel at substantially the same rate when the immunomodulatory delivery system is administered (e.g., a ratio of a diffusivity of the first immunomodulatory cargo through the hydrogel to a diffusivity of the second immunomodulatory cargo through the hydrogel can be less than 3).

This and other embodiments can include one or more of the following features. The hydrogel can include less than 5% polymer. The hydrogel can include 1.5%-3% polymer. The hydrogel can include approximately 2% polymer.

In general, in one embodiment, an immunomodulatory delivery system include a hydrogel, a first immunomodulatory cargo encapsulated in the cargo, and a second immunomodulatory cargo encapsulated in the hydrogel. The hydrogel includes a polymer non-covalently crossed-linked with a plurality of nanoparticles. The first immunomodulatory cargo is at least 2 times smaller than the second immunomodulatory cargo. The first and second immunomodulatory cargos are configured to be released from the hydrogel at substantially the same rate when the immunomodulatory delivery system is administered (e.g., a ratio of a diffusivity of the first immunomodulatory cargo through the hydrogel to a diffusivity of the second immunomodulatory cargo through the hydrogel can be less than 3).

This and other embodiments can include one or more of the following features. The first immunomodulatory cargo can be at least 5 times smaller than the second immunomodulatory cargo. The first immunomodulatory cargo can be at least 10 times smaller than the second immunomodulatory cargo.

Any of these embodiments can include one or more of the following features. The polymer can include hydroxypropylmethylcellulose (HPMC). The nanoparticles can include poly(ethylene glycol)-bpoly(lactic acid) (PEG-PLA). The hydrogel can include 4-12% nanoparticles. The first immunomodulatory cargo can be an adjuvant and the second immunomodulatory cargo can be an antigen. The first immunomodulatory cargo can be an adjuvant and the second immunomodulatory cargo can be an immunotherapy antibody. The hydrogel can be shear-thinning.

In general, in one embodiment, a method of treating a disease includes delivering the immunomodulatory delivery system of any of the embodiments described herein to a patient such that the first immunomodulatory cargo and the second immunomodulatory cargo release from the hydrogel at substantially the same rate (e.g., a ratio of a diffusivity of the first immunomodulatory cargo through the hydrogel to a diffusivity of the second immunomodulatory cargo through the hydrogel can be less than 3).

This and other embodiments can include one or more of the following features. The disease can be HIV. The first immunomodulatory cargo can include toll-like receptor agonists or saponins, and the second immunomodulatory cargo can include HIV SOSIP, HIV gp120, or HIV gp41. The disease can be malaria. The first immunomodulatory cargo can include toll-like receptor agonists or saponins, and the second immunomodulatory cargo can include circumsporozoite protein. The disease can be influenza. The first immunomodulatory cargo can include toll-like receptor agonists or saponins, and the second immunomodulatory cargo can include influenza hemagglutinin or influenza neuraminidase. The disease can be cancer. The first or second immunomodulatory cargo can include anti-PD1 antibodies, anti-PDL1 antibodies, anti-CD47 antibodies, anti-CD40 antibodies, anti-CD28 antibodies, toll-like receptor agonists, IL2 cytokines, IL12 cytokines, IL15 cytokines, GMCSF cytokines, chemokines, bispecific antibodies or bispecific T-cell engagers. Delivering the immunomodulatory delivery system can include injecting the immunomodulatory delivery system into the patient.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1 shows a schematic representation of an in vivo response to hydrogel-delivered vaccine. FIG. 1A shows that after subcutaneous (SC) injection of a hydrogel vaccine as described herein, local and migratory immune cells such as neutrophils and APCs infiltrate the gel and become activated. Activated antigen-presenting cells (APCs) may migrate to the draining lymph nodes (i). The gel provides sustained release of the vaccine cargo to the draining lymph nodes, prolonging the germinal center response (ii). FIG. 1B shows that the extended antigen availability in the germinal centers leads to increased (i) somatic hypermutation (SHM) and (ii) affinity selection, ultimately promoting higher affinity antibodies and a strong humoral immune response.

FIG. 2 shows polymer nanoparticle (PNP) hydrogel material and characterization. FIG. 2A shows that vaccine-loaded PNP hydrogels are formed when dodecyl-modified hydroxypropylmethylcellulose (HPMC-$C_{12}$) is combined with poly (ethylene glycol)-b-poly(lactic acid) (PEG-PLA) nanoparticles and vaccine cargo, including ovalbumin (OVA) and Polyinosinic-polycytidylic acid (Poly(I:C)). Multivalent and dynamic non-covalent interactions between the polymer and nanoparticles constitute physical crosslinks within the hydrogel structure. FIG. 1B shows the frequency-dependent ($\sigma$=1.8 Pa, 25° C.) oscillatory shear rheology of two PNP hydrogel formulations designated "2:10" (i.e., 2 wt % polymer and 10 wt % nanoparticles) and "1:5" gels (i.e., 1 wt % polymer and 5 wt % nanoparticles). FIG. 1C shows the steady shear rheology of two PNP hydrogel formulations designated "2:10" and "1:5" gels. FIG. 1D shows step-shear measurements of 2:10 and 1:5 gels over two cycles with high shear (100 $s^{-1}$) and low shear (0.05 $s^{-1}$) rates to investigate the rate of structural recovery of the hydrogels after flow at high shear rates reminiscent of the injection process. FIG. 1E shows yield stress measurements from stress ramp test (n=3). FIG. 1F includes images of 2:10 gel injection through a 21-gauge needle showing (i) before injection, (ii) during injection, (iii-iv) and after injection.

FIG. 3 shows the diffusivity of cargo and polymer in hydrogel. FIG. 3A shows a fluorescence recovery after photobleaching (FRAP) experiment showing photobleaching of a select area at 0 seconds, and the subsequent fluorescence recovery as fluorescent molecules diffuse back into the select area. FIG. 3B shows a representative schematic of (i) a 1:5 gel with OVA moving quickly and Poly(I:C) and the hydrogel matrix diffusing slower and (ii) a 2:10 gel with the OVA, Poly(I:C), and hydrogel matrix diffusing slowly. FIG. 1C shows a ratio of the diffusivity of OVA to the diffusivity of Poly(I:C) calculated from radius of hydration values for phosphate-buffered saline (PBS) or using FRAP for the 1:5 and 2:10 gels. Values closer to 1 indicate more similar diffusivities of the OVA and Poly(I:C) (n=3). FIG. 1D shows a ratio of the diffusivity of the cargo (OVA or Poly(I:C)) to the self-diffusivity of the hydrogel network, taken from the diffusivity of HPMC-$C_{12}$ within the hydrogel. Values closer to 1 indicate that cargo diffusivity is limited by self-diffusion of the hydrogel (n=3).

Figure 4:
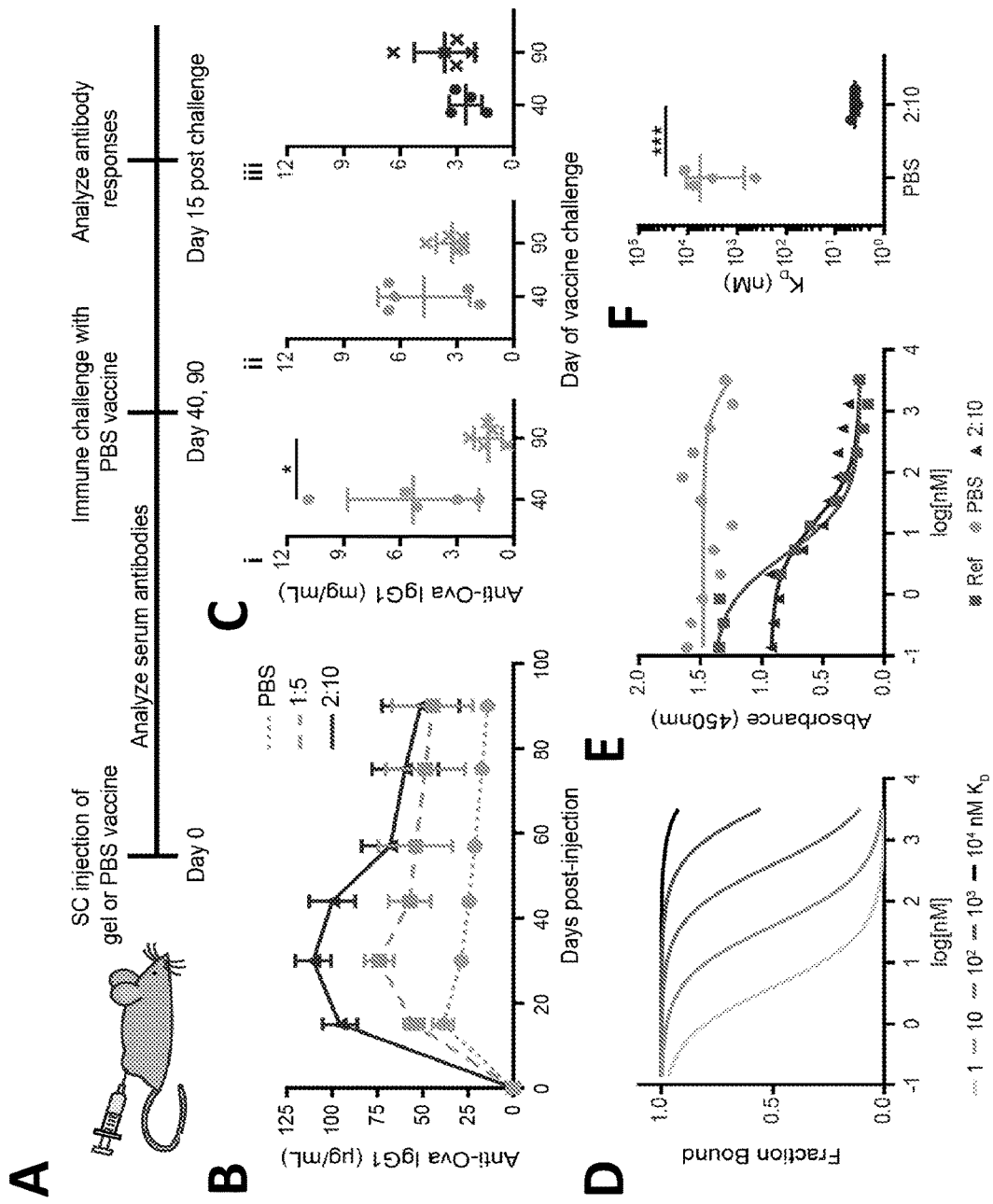

FIG. 4 shows antibody concentration and affinity. FIG. 4A shows the timeline of the experimental setup shows SC injection at day 0, antibody analysis after single injection, immune challenge with the PBS vaccine formulation at day 40 or 90, and analysis after 15 days. FIG. 4B shows serum anti-OVA IgG1 concentrations from day 0 to day 90 after single injection of vaccines (n=5 to 19). FIG. 4C shows serum anti-OVA IgG1 concentrations after day 40 or 90 challenge with (i) PBS vaccine, (ii) 1:5 gel vaccine, and (iii) 2:10 gel vaccine (n=4 to 5). FIG. 4D shows model competitive binding data with $K_D$ ranging from 1 to $10^4$ nM for comparison. FIG. 4E shows average binding curves for 2:10 gel and PBS vaccine groups after the day 90 challenge compared to a mAb reference (n=3 to 4). FIG. 4F shows calculated $K_D$ values from fitted binding curves for 2:10 gel and PBS vaccine groups. Error bars, (b) mean±s.e.m., (c, f) mean±s.d., *p<0.05, ***p<0.001 with t-test.

Figure 5:
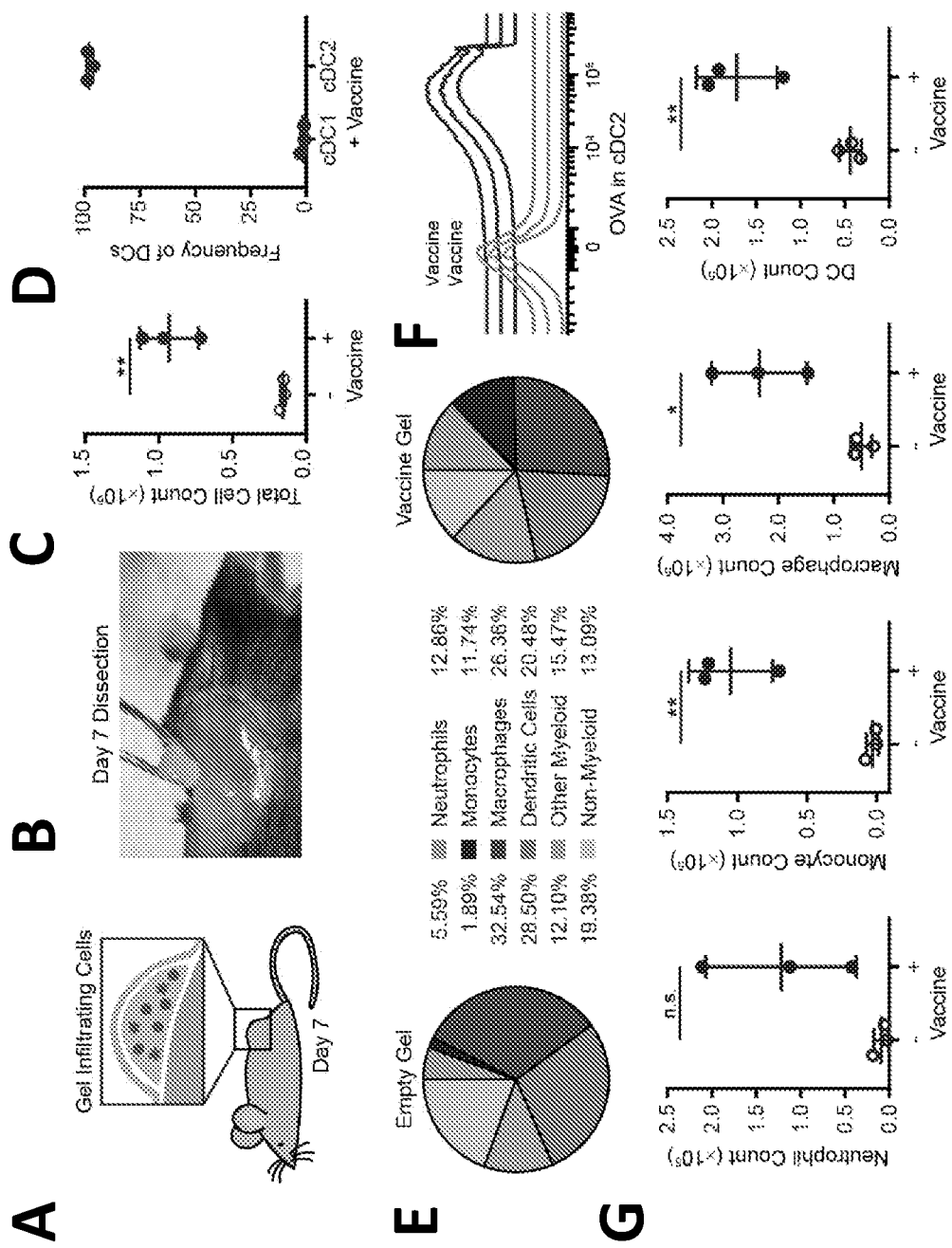

FIG. 5 shows the local inflammatory niche. FIG. 5A is a schematic of inflammatory niche in gel depot. FIG. 5B is a picture of surgical removal of 2:10 gel after 7 days. FIG. 5C shows the total cells in 2:10 gel with or without vaccine were quantified with flow cytometry. FIG. 5D shows the frequency of cDC1 ($XCR1^{hi}CD11b^{lo}$) and cDC2 ($XCR1^{lo}CD11b^{hi}$) of the total dendritic cells (DCs) in the vaccine-loaded 2:10 gel. FIG. 5E shows the frequency of neutrophils, monocytes, macrophages, DCs, other myeloid cells, and non-myeloid cells within CD45$^+$. FIG. 5F shows the total cell count of neutrophils, monocytes, macrophages, and DCs found in the empty and vaccine-loaded 2:10 gels. FIG. 5G is a histogram of the Alexa-647 OVA signal in cDC2s from individual mice with and without the vaccine. For FIGS. 5C-5G, n=3. Error bars, mean±s.d. *p<0.05, **p<0.01 with t-test.

Figure 6:
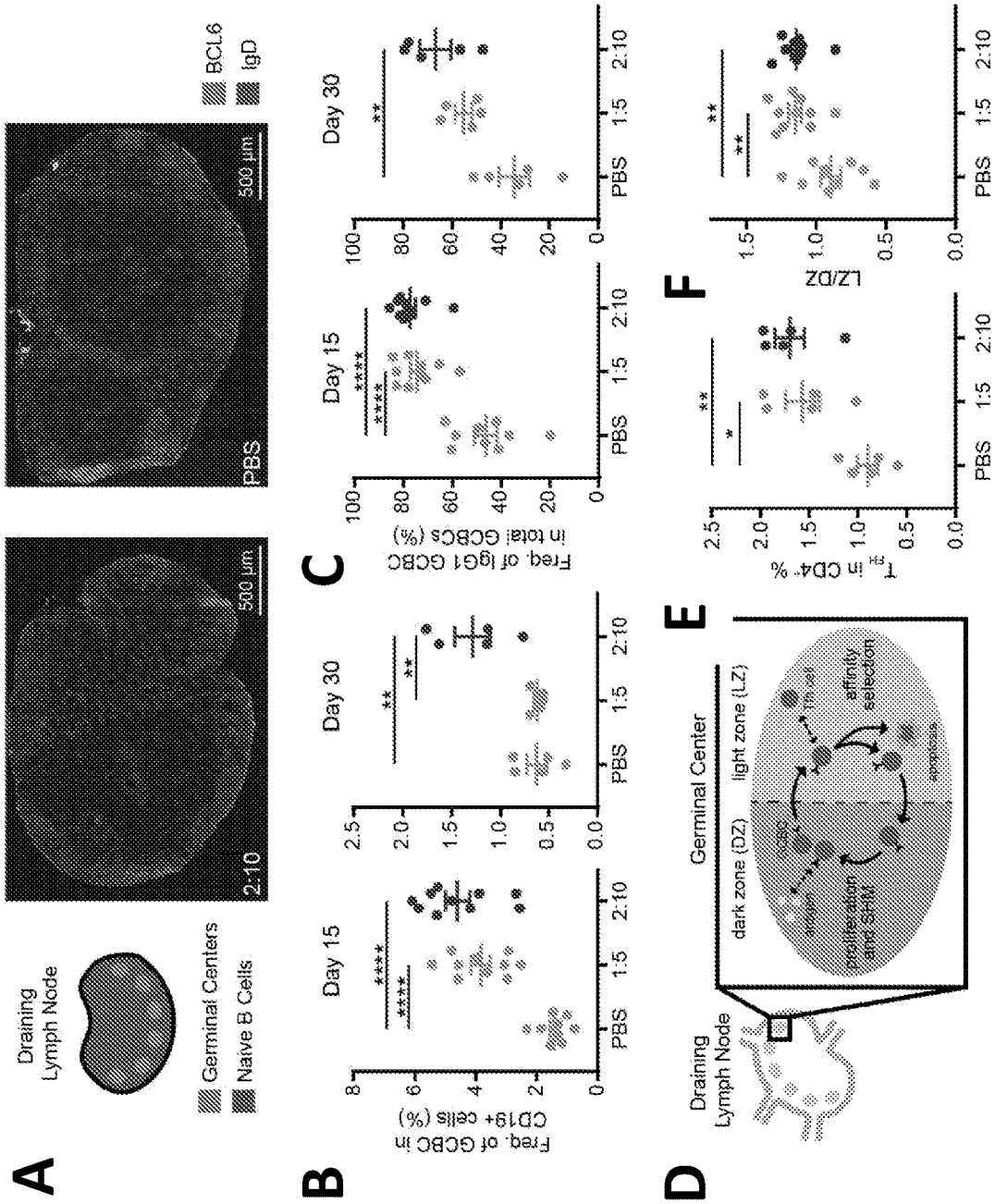

FIG. 6 shows the germinal center response to single vaccine administration. FIG. 6A shows the immunohistochemistry (IHC) of explanted inguinal lymph node 15 days after vaccine administration in 2:10 and PBS groups to visualize germinal centers and naïve B cells. FIG. 6B shows the frequency of germinal center B-cells (GCBCs) within total B-cells measured by flow cytometry at day 15 and 30 after vaccination (n=5 to 10). FIG. 6C shows the frequency of IgG1+GCBCs within total GCBCs in the inguinal lymph nodes measured by flow cytometry at day 15 and 30 after vaccination (n=5 to 10). FIG. 6D is a schematic showing the draining of a lymph node. FIG. 6E shows the percent of $T_{FH}$ cells out of CD4$^+$ cell in the inguinal lymph nodes at day 15 after vaccination (n=5 to 10). FIG. 6F shows the ratio of light zone (LZ) to dark zone (DZ) GCBCs in the inguinal lymph nodes at day 15 after vaccination (n=5 to 10). Error bars, mean±s.d. *p<0.05, p<0.005, *p<0.001, ****p<0.0001 with analysis of variance (ANOVA).

Figure 7:
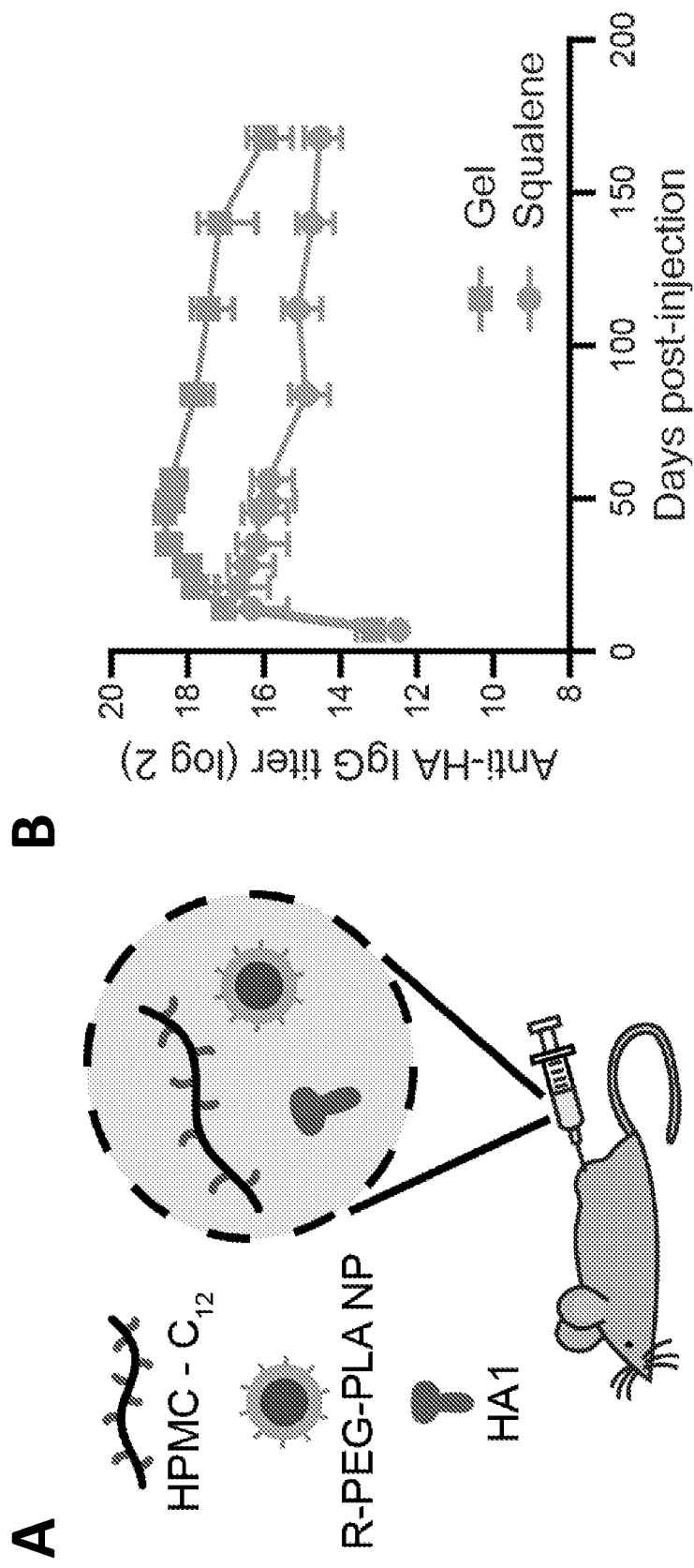

FIG. 7A is a schematic showing the use of hemagglutinin (HA) from influenza. FIG. 7B shows that the vaccine response is much stronger than one of the most potent adjuvants currently used clinically, squalene (also known as MF-59).

Figure 8:
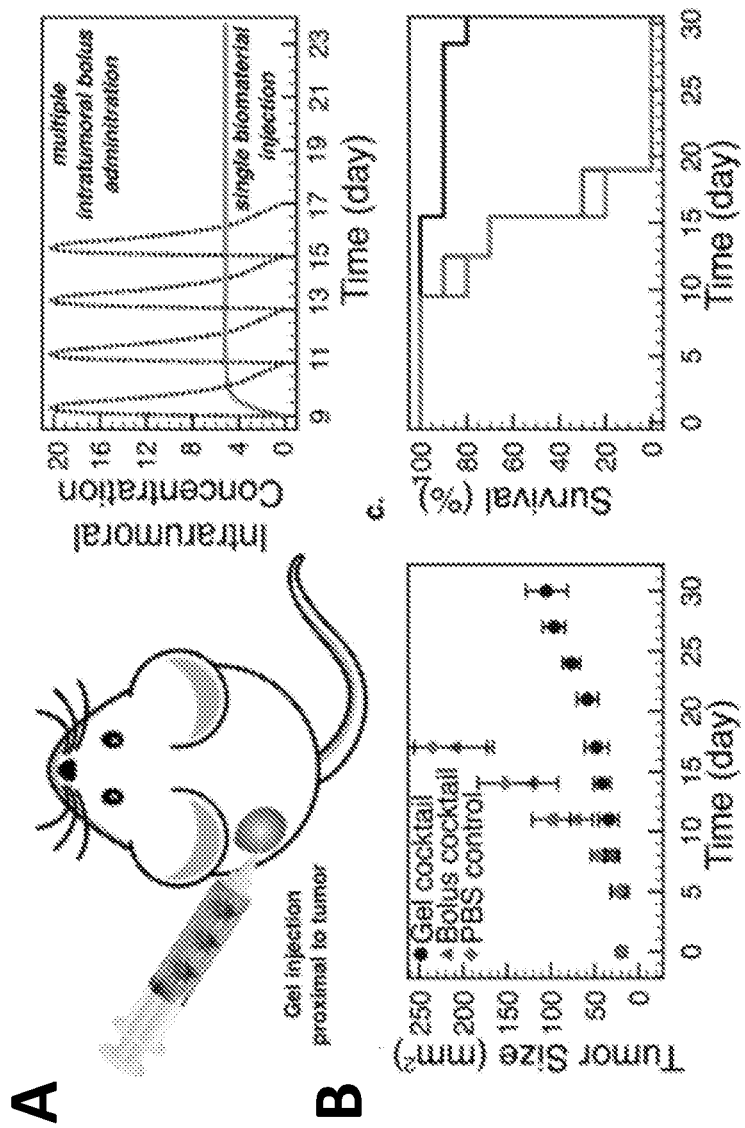

FIG. 8 shows the treatment of B16F10 melanoma in C57/BL6 mice. FIG. 8A shows preliminary studies with PNP hydrogels (100 µl) carrying an immunotherapy cocktail comprising tumor vaccine of TRP1 (40 µg) and poly(I:C) (40 µg), IL2 (200 ng), and anti-CD28 antibody (40 µg). As shown in FIG. 8B, a single administration produces a significant decrease in the rate of tumor grown (p<0.0001). As shown in FIG. 8C, a single administration produces a dramatic survival benefit (p<0.0001) when compared with a series of four bolus administrations of the same cocktail, which is indistinguishable from a PBS control (n=10 for all groups). PNP hydrogel-based cocktail was injected proximal to the tumor site, while the bolus cocktail and PBS control were injected intratumorally.

Figure 9:
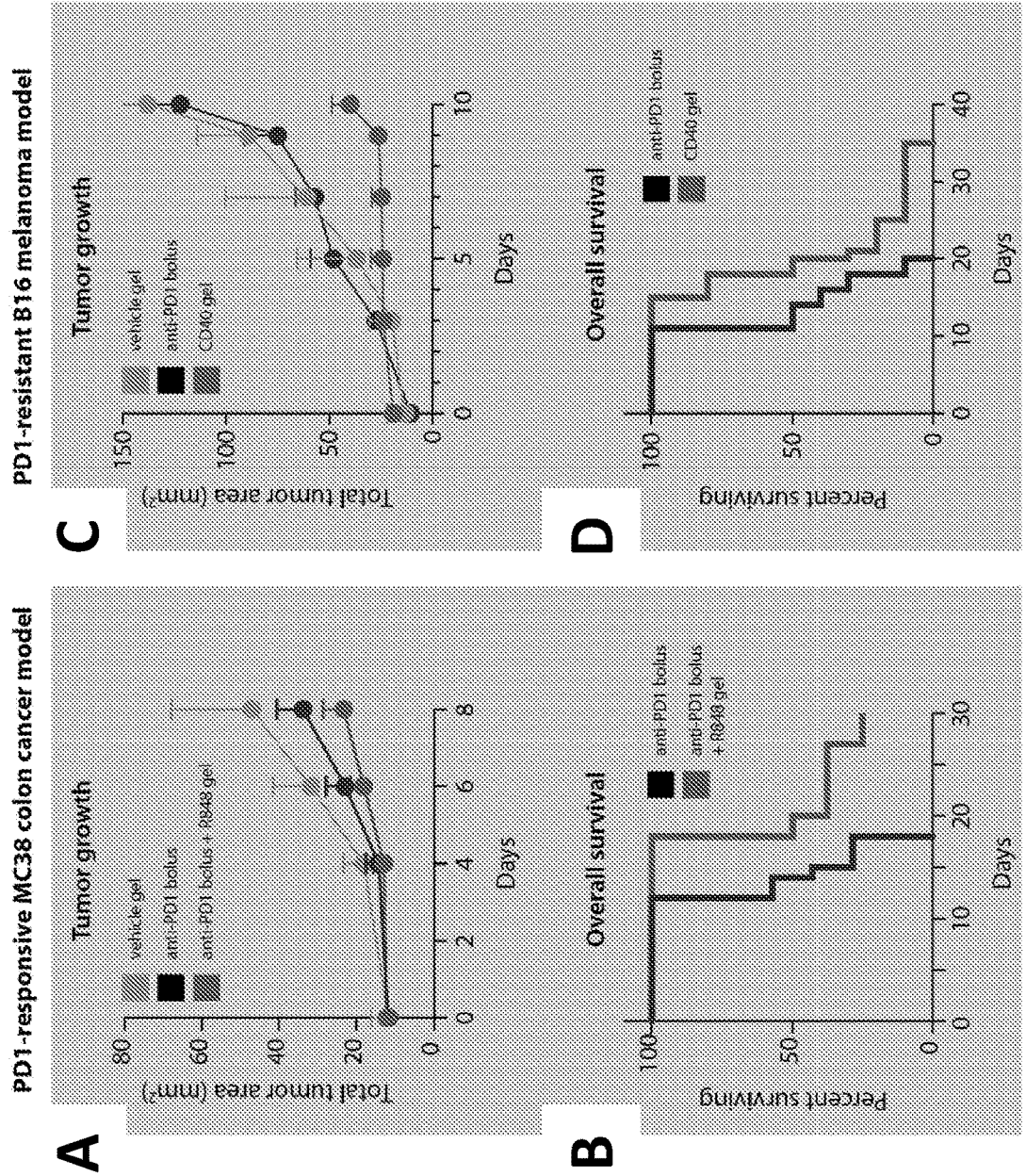

FIG. 9 shows that PNP hydrogels slow tumor growth and extend survival in both immuno-responsive and nonresponsive models of cancer. FIG. 9A shows that Resiquimod (R848)-loaded PNP hydrogel therapy combined with weekly systemic anti-PD1 delivery slows mouse colon adenocarcinoma (MC38) growth in C57BL/6 mice as compared to both weekly systemic anti-PD1 delivery and an empty PNP hydrogel. FIG. 9B shows that the combination R848 PNP hydrogel and soluble anti-PD1 therapy significantly extends survival compared to weekly systemic anti-PD1 therapy alone, yielding durable cures. FIG. 9C shows that the delivery of monoclonal anti-CD40 antibodies from the PNP hydrogel slows B16F10 melanoma growth in C57BL/6 mice as compared to weekly systemic anti-PD1 therapy. FIG. 9D shows that monoclonal anti-CD40 PNP hydrogel therapy significantly extends survival compared to weekly systemic anti-PD1 therapy. N=8 for all groups.

Figure 10:
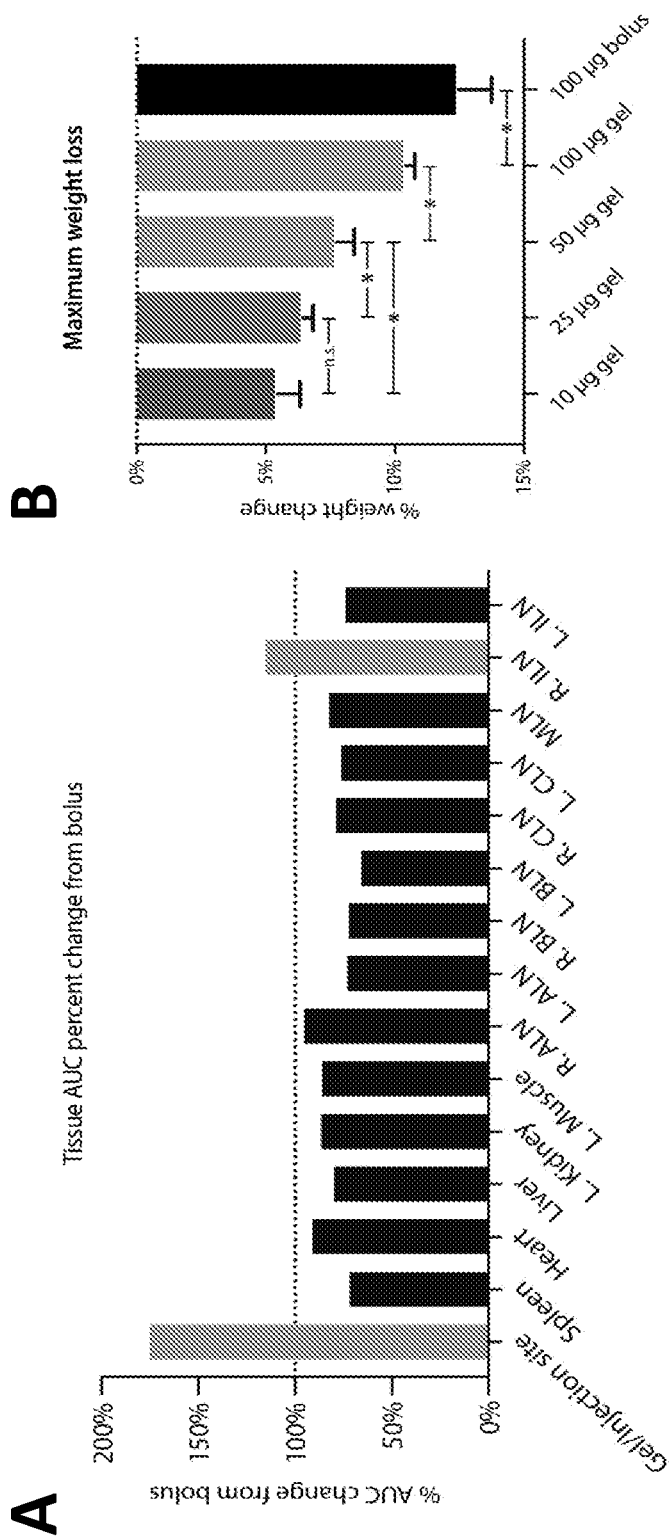

FIG. 10 shows that PNP gels reshape the pharmacokinetics and biodistribution of anti-CD40 antibodies, reducing their off-target toxicity. FIG. 10A is a graph showing the Tissue AUC percent change from bolus. PET imaging of radiolabeled cargo was used to determine antibody exposure (AUC) in distinct tissues over two weeks. The percent change from bolus AUCs indicates that PNP gels increase exposure at the injection site and at the draining lymph node (blue bars) while reducing exposure to all other organs. R. indicates right, L. indicates L. ALN=axial lymph node; BLN=brachial lymph node; CLN=cervical lymph node; MLN=mesenteric lymph node; ILN=inguinal lymph node. FIG. 10B shows the maximum weight loss. Gels reduce the acute weight loss associated with anti-CD40 treatments, consistent with a reduction of exposure to off-target organs. * indicates q-values<0.05 from a one-way ANOVA with multiple testing corrected with the FDR approach.

Figure 11:
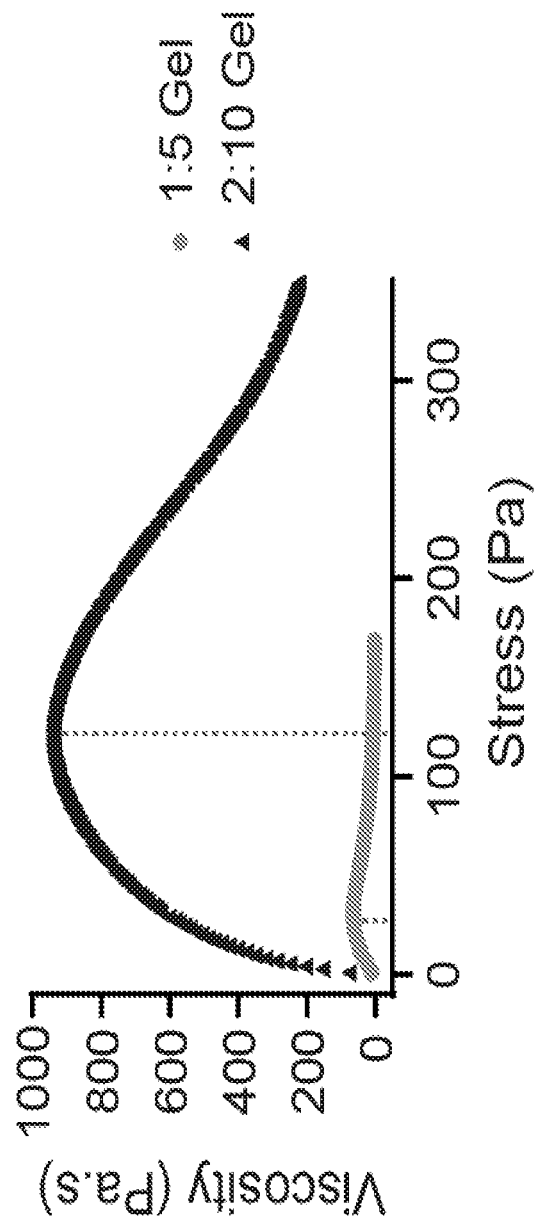

FIG. 11 shows a stress ramp rheological experiment for 1:5 and 2:10 gels. Yield stress was measured from the peak viscosity.

Figure 12:
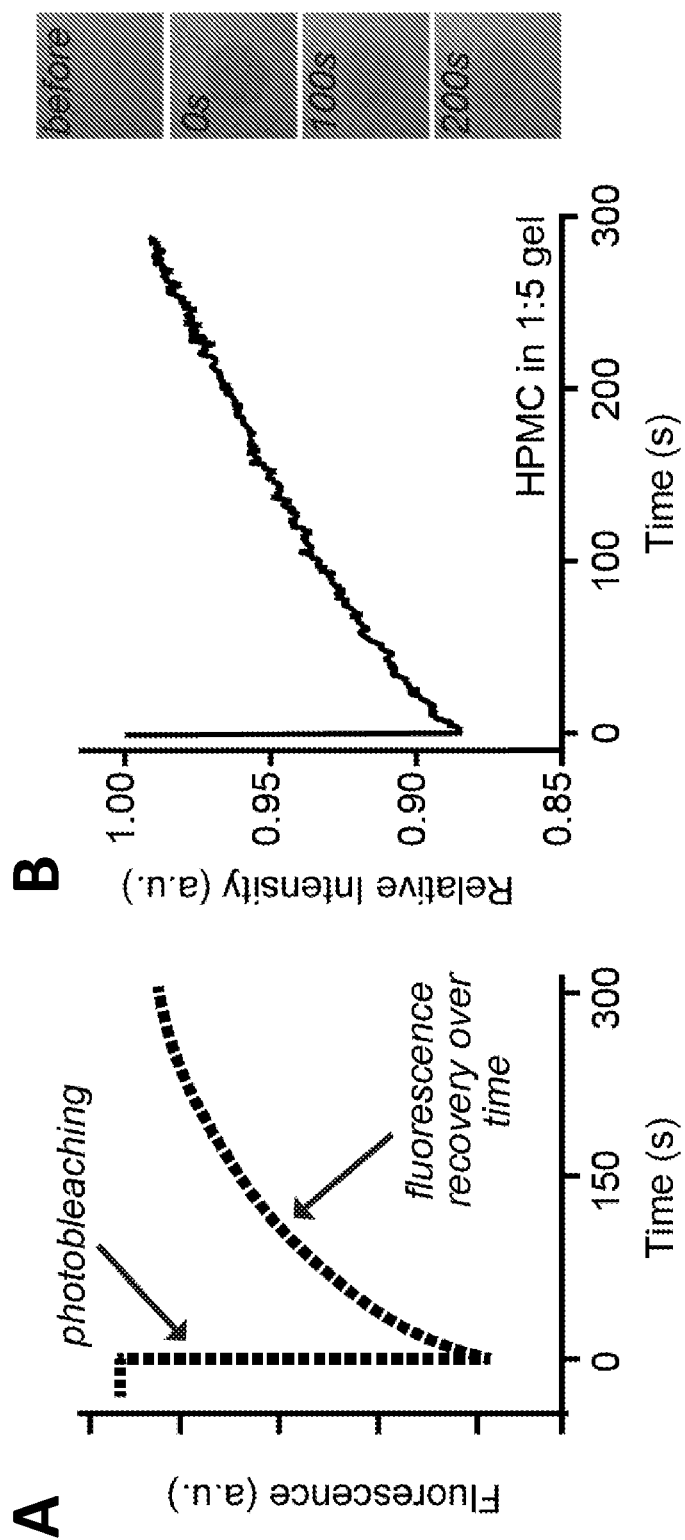

FIG. 12 shows a representative fluorescence recovery after photobleaching (FRAP) experiment. FRAP was used to characterize the mobility of the cargo and polymer through the hydrogel systems. FIG. 12A shows the fluorescence vs. time. Several frames using a low light level are acquired to determine the initial fluorescence, and then a high intensity of light for a short time inside a region of interest is applied to bleach the fluorescence in the sample. Finally, the recovery of fluorescence is monitored to measure how fast the molecule of interest redistributes. FIG. 12B shows the relative intensity vs. time. The figure shows raw data probing the self-diffusion of HPMC within the weak hydrogels.

Figure 13:
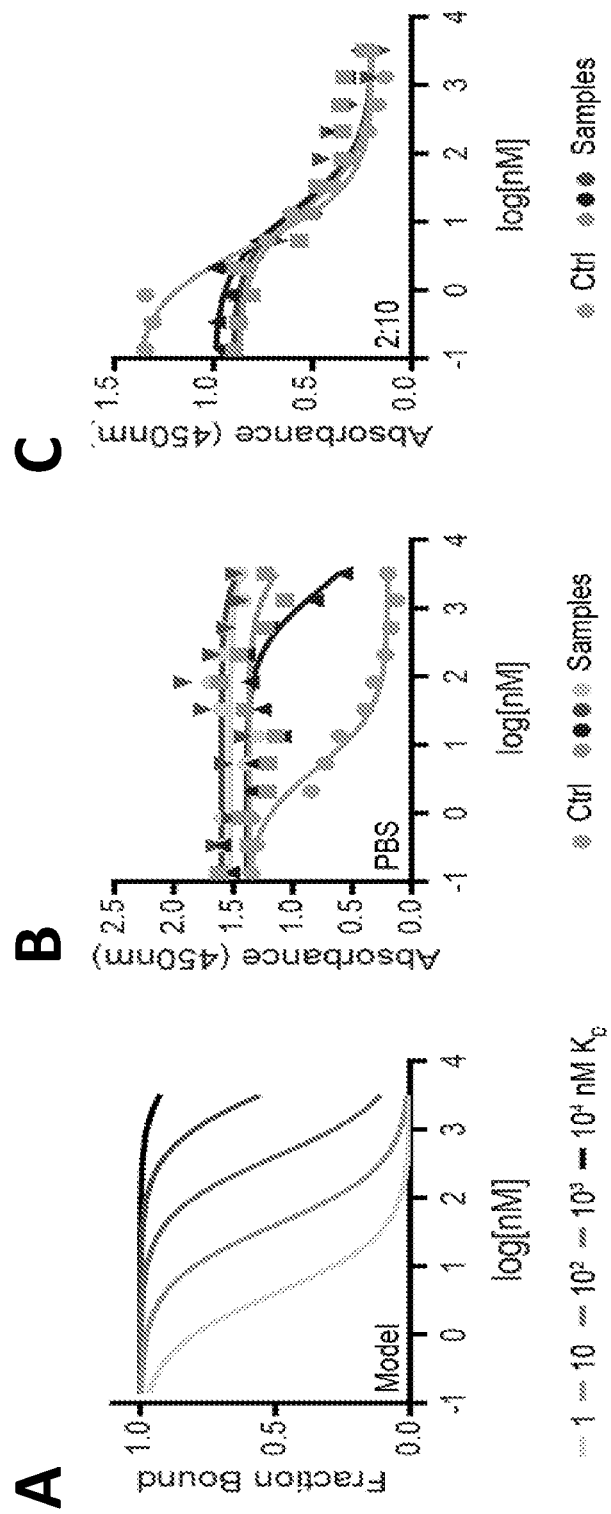

FIG. 13 shows competitive binding assay with serum after the day 90 challenge. FIG. 13A shows model data with $K_D$ ranging from 1 to $10^4$ nM for comparison. FIG. 13B shows individual binding curves for all PBS samples with fits. FIG. 13C shows individual binding curves for all 2:10 samples with fits.

Figure 14:
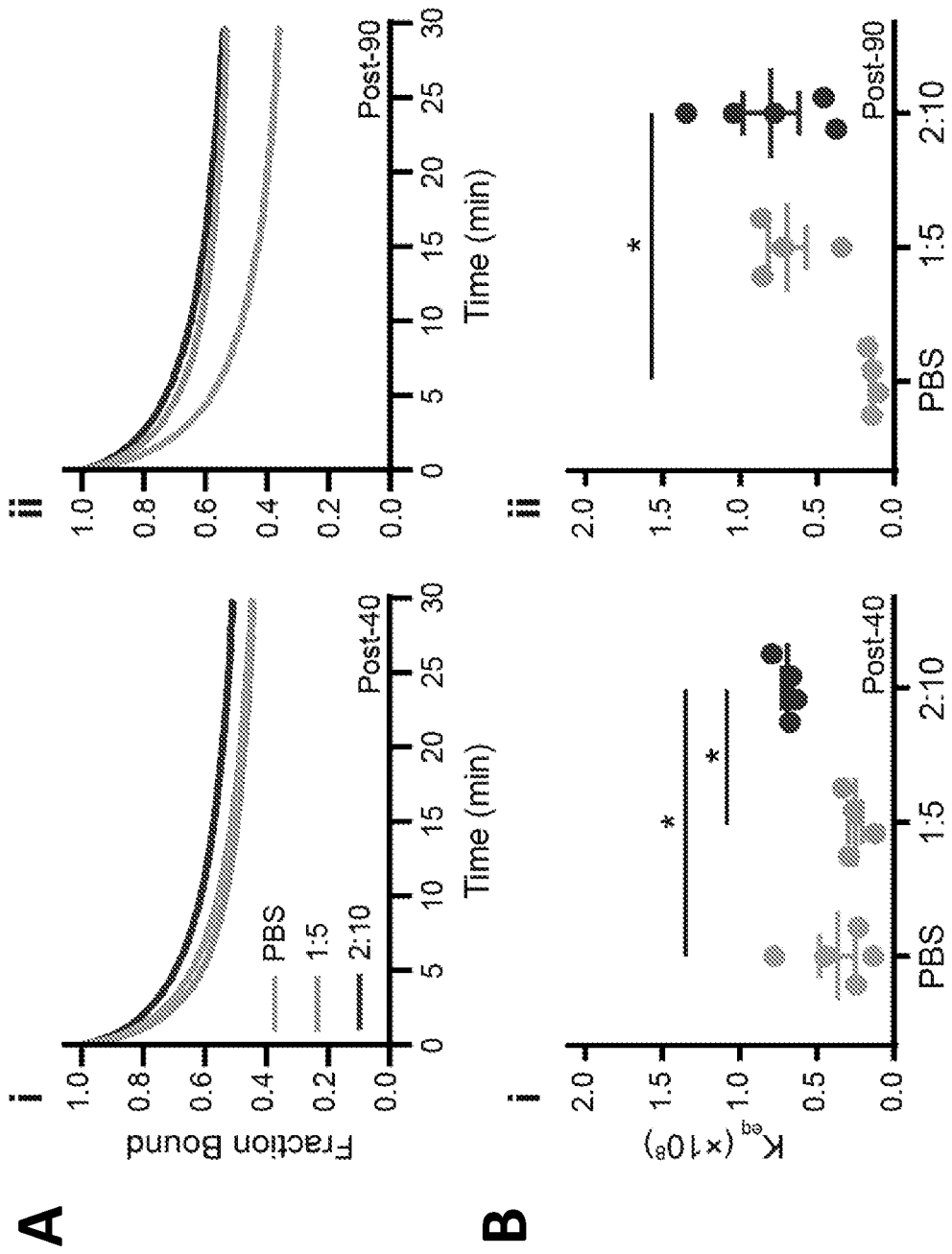

FIG. 14 shows surface plasmon resonance (SPR) affinity analysis of anti-OVA serum antibodies post-challenge. FIG. 14A shows OVA dissociation from serum antibodies measured by surface plasmon resonance (SPR) from day (i) 40 and (ii) 90 challenge (n=4). FIG. 14B shows $K_{eq}$ values for high-affinity antibodies from SPR for day (i) 40 and (ii) 90 challenge using the lowest $k_d$ from a 3-decay fit of the dissociation and the measured $k_a$ (n=4 to 5).

Figure 15C:
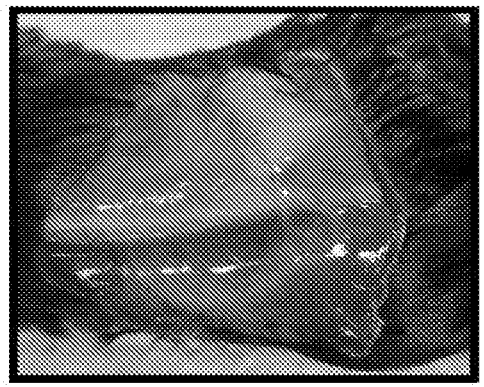
Figure 15B:
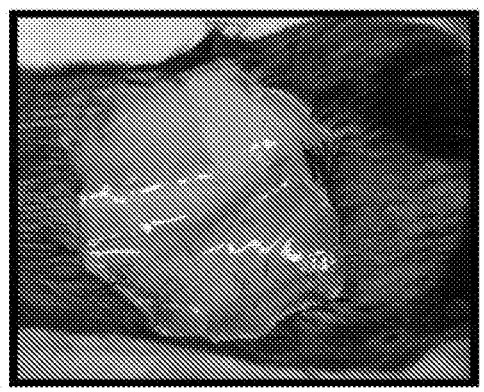
Figure 15A:

FIG. 15 includes images of subcutaneous space 8 weeks after vaccine injections. FIG. 15A is for the PBS. FIG. 15B is for 1:5 gel. FIG. 15C is for 2:10 gel groups. Images indicate no noticeable vascularization or fibrotic response differences.

FIG. 16 is a table of cargo and polymer diffusivities (measured with FRAP).

DETAILED DESCRIPTION

Described here in a polymer nanoparticle (PNP) delivery platform (e.g., for vaccines or other immunotherapy). PNP hydrogels are a type of supramolecular hydrogel where the polymeric constituents are held together by dynamic non-covalent interactions between polymers and nanoparticles. Such PNP hydrogels can benefit from many of the favorable characteristics of traditional covalently cross-linked hydrogels, such as high drug loading capacity, gentle conditions for encapsulation of biologic cargo, sustained delivery of cargo, and mechanical tunability. In addition, unlike traditional covalently cross-linked hydrogels, PNP hydrogels can be easily administered as a vaccine or immunotherapy due to their shear thinning and self-healing properties. The fabrication process for the PNP hydrogels described herein, which is scalable and therefore highly translatable, involves simple mixing of the polymer, nanoparticles (NPs), and an aqueous solution of the cargo.

The single injection platform using PNP hydrogel formulations described herein provides sustained vaccine or immunotherapy delivery as well as a local inflammatory niche. The platform can be easily injected and initiate the vaccine response locally through recruitment of neutrophils and antigen presenting cells (APCs), while also providing sustained release of vaccine cargo (FIG. 1A). APCs process and present antigen, providing necessary signals for the adaptive immune response. The platform can enhance the adaptive immune response by providing an immunomodulatory niche. In addition, sustained release of soluble antigen from the platform can provide signals to germinal centers (GCs) in the lymph nodes—the structures responsible for the affinity maturation of B cells—leading to high affinity antibody production and humoral immune memory formation (FIG. 1B). The platform described herein can advantageously produce an enhanced and prolonged humoral immune response with a single administration of a vaccine-loaded PNP hydrogel.

The shear-thinning and self-healing PNP hydrogels described herein have favorable material properties and a mild synthesis approach that is scalable and versatile due to their ability to load biologic cargo by simple mixing, making them well-suited for encapsulation and delivery of combination immunotherapies. The cargo-loaded hydrogels are injectable and can retain their solid-like structure when under low stresses, enabling creation of a new stimulatory microenvironment within the body and sustained delivery of vaccines or immunotherapies. The PNP hydrogel can be used, for example, to replace PBS as a delivery vehicle, and can be used with any vaccine or immunotherapy. The unique dynamic network rearrangement in these materials enables co-release of multiple cargo that can be dramatically different in size or chemical makeup.

In some embodiments, the PNP hydrogels described herein can be made of one or more polymers, such as cellulose derivatives, such as hydroxypropylmethylcellulose (HPMC), hydroxyethylcellulose (HEC), methylcellulose (MC), carboxymethylcellulose (CMC), or hydroxypropylcellulose (HPC), or hyaluronic acid (HA) optionally modified with a hydrophobic moiety, such as hexyl (—$C_6$), octyl (—$C_8$), decyl (—$C_{10}$), dodecyl (—$C_{12}$), phenyl (Ph), adamantyl, tetradecyl (—$C_{14}$), oleyl, or cholesterol (e.g., 5-30% modification, such as 5-25% modification, such as approximately 10-15% or 25%). In one specific embodiment, HPMC is 10-15% modified with dodecyl. In another specific embodiment, HEC is 25% modified with dodecyl. In another specific embodiment, HEC is 10% modified with cholesterol. Further, the polymer can be mixed with nanoparticles, such as nanoparticles having a diameter of less than 100 nm, such as 30-50 nm, such as approximately 40 nm. The nanoparticles can be can be a core-shell nanoparticles with hydrophobic cores, such as poly(ethylene glycol)-block-poly(lactic acid) (PEG-PLA) or poly(ethyleneglycol)-block-poly(caprolactone) (PEG-PCL) nanoparticles.

In some embodiments, the PNP hydrogel formulations described herein can be used to simultaneously deliver (and/or deliver at approximately the same rate) two different components (or cargos) of substantially different molecular weight and/or size while exhibiting similar diffusion out of the PNP hydrogel. For example, the larger cargo (e.g., an antigen or antibody) can have a weight or diameter that is at least 2×, 4×, 5×, 6×, 10×, 20×, 50×, or 100× the weight or diameter of the smaller cargo (e.g., an adjuvant or cytokine). In some embodiments, the ratio of the diffusivity of the smaller cargo through the PNP hydrogel to the diffusivity of the larger cargo through the PNP hydrogel can be less than 3, such as less than 2, such as less than 1.5. Further, a ratio of the diffusivity of the first cargo or the second cargo to the self-diffusivity of the PNP hydrogel can, in some embodiments, be less than 10, such as less than 6, such as between 2 and 10 or between 3 and 6. Having a diffusivity of the cargos that is close to the self-diffusivity of the hydrogel helps to ensure that the cargos are both released from the PNP hydrogel at substantially the same rate.

Further, in some embodiments, the PNP hydrogels can be made of greater than 1% polymer by weight, such as greater than 1% and less than 5% by weight, such as 1.5-3% polymer by weight, such as approximately 2% polymer by weight. Having a polymer percentage within these ranges can help ensure that two different cargos (e.g., of different molecular weight and/or size) can be released substantially simultaneously and/or at the same rate from the PNP hydrogel. In some embodiments, the PNP hydrogel can include 4-12% nanoparticles, such as 8-11%, such as 10% nanoparticles. Having a percentage of nanoparticles within these ranges helps ensure that the PNP remains stable and the diffusivity of the cargo remains constant and substantially consistent. As used here, an "X:Y gel" can refer to X wt % polymer and Y wt % nanoparticles.

The PNP hydrogels described herein can be used as a platform to deliver a variety of immunomodulatory compounds for the treatment or prevention of a variety of diseases. For example, the PNP hydrogels can be used to deliver an antigen, such as influenza hemagglutinin or influenza neuraminidase, and an adjuvant, such as toll-like receptor agonists or saponins for prevention or treatment of influenza. As another example, the PNP hydrogels can be used to deliver an antigen, such as HIV SOSIP, HIV gp120, HIV gp41, and an adjuvant, such as toll-like receptor agonists or saponins, for prevention or treatment of HIV. As another example, the PNP hydrogels can be used to deliver an antigen, such as circumsporozoite protein, and an adjuvant, such as toll-like receptor agonists or saponins for prevention or treatment of malaria. As another example, the PNP hydrogels can be used to deliver an immunotherapy antibody, such as anti-PD1, anti-PDL1, anti-CD47, anti-CD40, and anti-CD28 antibodies, and an adjuvant, such as toll-like receptor agonists for prevention or treatment of cancer. As another example, the PNP hydrogels can be used for co-delivery of antibodies against a specific tumor (e.g., anti-HER2 for breast cancer or anti-TRP1 for melanoma) with immunotherapy antibodies and/or adjuvants. In some embodiments, the PNP hydrogels can be used to deliver cytokines (such as IL2, IL 12, IL15, GMCSF and chemokines), antibodies (e.g., bispecific antibodies), and/or bispecific T-cell engagers) for the prevention or treatment of cancer.

Experimental Results 1—Properties of Hydrogels

Figure 2:
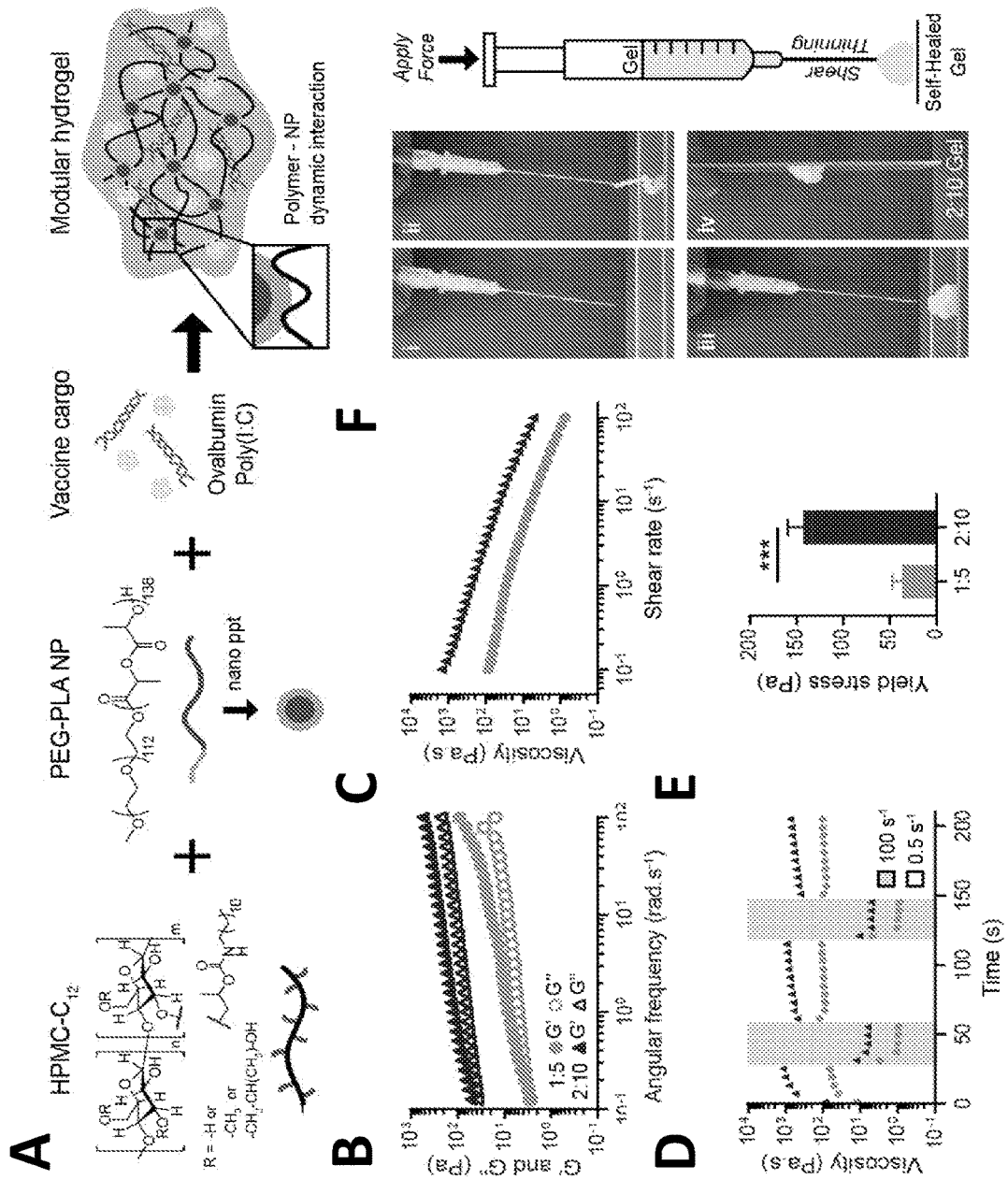

The PNP hydrogel platform described herein can load vaccine (or other immunotherapy) components with high efficiency, is injectable, and can be tuned to prolong exposure. In one embodiment, the PNP hydrogel was formed rapidly when aqueous solutions of hydroxypropylmethylcellulose derivatives (HPMC-$C_{12}$) were mixed with biodegradable polymeric nanoparticles (NPs) composed of poly(ethylene glycol)-b-poly(lactic acid) (PEG-PLA) (FIG. 2A). A commonly used model antigen, ovalbumin (OVA), and an adjuvant, Poly(I:C) (toll-like receptor 3 agonist) was incorporated experimentally as a model or exemplary subunit vaccine. The non-covalent crosslinks that hold the PNP hydrogel together can advantageously ensure complete (or substantially complete) encapsulation efficiency because all components that are mixed into the container become part of the gel. This simple synthesis also enabled the creation of numerous hydrogel formulations by changing the ratio of HPMC-$C_{12}$ to NP to PBS. Described herein are two exemplary formulations that were created: (i) a formulation including 1 wt % HPMC-$C_{12}$ and 5 wt % NP, designated "1:5"; and (ii) a formulation include 2 wt % HPMC-$C_{12}$ and 10 wt % NP, designated "2:10". These two different formulations were used to probe how different timeframes of vaccine exposure may influence the immune response.

The rheological properties of the formulated gels were measured. Frequency-dependent oscillatory shear experiments, performed in the linear viscoelastic regime, demonstrated a formulation-dependent frequency response in these gels (FIG. 2B). At a representative angular frequency ($\omega$=10 rad/s), the 1:5 and 2:10 gels had storage moduli (G') of 20 Pa and 262 Pa, respectively. An angular frequency sweep showed that gels remained solid-like for a wide range of frequencies, with the G' remaining above the loss modulus (G") (FIG. 2B). A shear rate sweep showed that the viscosity of these PNP hydrogels decreased over two orders of magnitude with increasing shear rates, thereby demonstrating their ability to shear-thin (FIG. 2C). The 1:5 gel exhibited a lower viscosity than the 2:10 gel across the shear rates $10^{-1}$ to 102 $s^{-1}$.

Both gel formulations were shown to be injectable, an important consideration for future translation of the material as a vaccine platform. Injectability was tested by measuring the viscosity of the gels when alternating between a high shear rate (100 $s^{-1}$) reminiscent of the injection process and a low shear rate (0.5 $s^{-1}$) reminiscent of the working conditions. The viscosity of both gel formulations decreased by over two orders of magnitude with the applied high shear rate and rapidly recovered (<5 s) to their original viscosity when returned to a low shear rate (FIG. 2D). This behavior was repeatable over several cycles, indicating that the shear thinning was driven by the rupture of the non-covalent crosslinks between the polymer and NPs, and not through cleavage of covalent bonds within the polymers. These rheological observations describe how the gel properties changed during injection from a syringe. The gel has a high viscosity when in the syringe, but as pressure is applied it shear-thins and flows through the needle before rapidly returning to a high viscosity once exiting the needle (FIG. 2F). The yield stress of these materials was determined by a stress ramp to be 29 Pa and 122 Pa for the 1:5 and 2:10 gels, respectively (FIG. 2*e*, FIG. 11). These values describe both gels' ability to remain solid-like under low stresses (i.e., before and after the injection), therefore maintaining a gel structure after injection and preventing flow from the implantation site.

To characterize the dynamics of vaccine exposure from the vaccine-loaded gels, the diffusivities of cargo in the two gel formulations was assessed. Fluorescence recovery after photobleaching (FRAP) was leveraged to characterize the microscopic interactions influencing the diffusion of the cargo (FIG. 3A, FIG. 12). The PNP gels are unique compared to traditional covalently cross-linked gels as their bonds are dynamic and continuously rearrange. This results in self-diffusion of the polymer network within the intact hydrogel.

OVA's hydrodynamic radius ($R_H$) is 3.2 nm, corresponding to a diffusivity value, D, of 76.6 $\mu m^2/s$. Poly(I:C)'s was measured to be much larger, with an $R_H$ of 34.2 nm, using multi-angle light scattering (MALS), corresponding to a D value of 7.2 $\mu m^2/s$. This difference in size results in OVA having an over 10 times greater diffusivity than Poly(I:C) in PBS (FIG. 3C). In contrast, FRAP measurements of the molecular cargo in the gels demonstrated that the hydrogel mesh reduced diffusivities by multiple orders of magnitude, whereby the diffusivity of OVA was determined to be 1.44 $\mu m^2/s$ in the 1:5 gel and 0.8 $\mu m^2/s$ in the 2:10 gel. The measured diffusivities for all experiments can be found in FIG. 16. With a standard injection volume in rodents (100 μL) and the release characteristics of PNP hydrogels, these OVA diffusivities correlate to release timeframes of approximately 2 and 3 weeks, respectively. Further, the ratio of OVA to Poly(I:C) diffusivities ($D_{OVA}/D_{Poly(I:C)}$) was 3.3 in the 1:5 gel, and only 1.4 in the 2:10 gel (FIG. 3C). When comparing the diffusivity of OVA to the self-diffusion of the hydrogel matrix ($D_{OVA}/D_{Gel}$), which was determined by tracking the diffusivity of HPMC-$C_{12}$ within the hydrogel, the ratio was 6.5 in the 1:5 gel, but only 4.7 in the 2:10 gel, while the ratio of Poly(I:C) to the hydrogel self-diffusion ($D_{Poly(I:C)}/D_{Gel}$) was around 2 for the 1:5 gel and 3.5 for the 2:10 gel (FIG. 3D). These data suggest that in both gels, Poly(I:C) was immobilized by the hydrogel mesh, suggesting that the size of the Poly(I:C) is larger than the effective mesh size of the hydrogel such that the diffusion of Poly(I:C) in both gels is limited by the self-diffusion of the hydrogel network. The diffusion of OVA, however, is more limited by hydrogel self-diffusion in the 2:10 gel and appears to be small enough to diffuse more freely in the 1:5 gel (FIG. 3B). Accordingly, the diffusivity of both OVA and Poly(I:C) is restricted by the self-diffusion of the hydrogel network in the 2:10 gel and are thus similar to one another, enabling sustained co-delivery of the two cargo, despite their large difference in physicochemical properties.

Experimental Results 2—Humoral Immune Response to Vaccination

To investigate if sustained vaccine exposure from a single administration of the hydrogel vaccines (gel carrying OVA and Poly(I:C)) could enhance the magnitude and duration of the humoral response, the antigen specific antibodies were quantified in the serum after subcutaneous (SC) injection (FIG. 4A). Humoral immunity is a component of the adaptive immune response mediated by antibodies. The peak concentration of OVA-specific serum antibodies was 2-3 times higher for mice receiving the gel-based vaccines than mice receiving the same vaccine in a standard PBS bolus administration (FIG. 4B). The 1:5 and 2:10 gel-based vaccines yielded antibody concentrations higher than the PBS peak response past day 90. The increased magnitude and duration of the primary antibody response suggests that delivery of vaccines in these gels would afford longer protection against the target pathogen.

The efficacy of a vaccine is most readily understood when looking at the immune response after the vaccinated host is challenged with the pathogen of interest. To imitate pathogen infection post-vaccination, mice were injected with OVA and Poly(I:C) in PBS for all groups (FIG. 4A). Poly(I:C) was included in the challenge formulation to emulate the PAMPs that would be found on the pathogen in a real infection. Though this Poly(I:C) also may act as a boost to the immune system, all mice were treated with the same challenge formulation, so their responses would be comparable. The immune memory was assessed by challenging separate groups of mice at 40 or 90 days post-vaccination (FIG. 4C). The OVA-specific serum antibodies were assessed 15 days after the challenge for concentration and antigen-specific affinity, two complementary characteristics of the humoral response. Both gel groups exhibited strong antibody responses to challenge at both time-points (FIG. 4Cii-iii). This indicates a robust humoral memory response compared to the PBS group, which had a 3.8-fold decrease in antibody production between the challenge at 40 days and 90 days (FIG. 4Bi).

The affinities of the serum antibodies for the PBS and 2:10 groups were determined after the 90 day challenge towards OVA using a competitive binding ELISA. Dilutions of the mouse serum were mixed with a constant amount of an HRP conjugated monoclonal anti-OVA antibody (mAb) to determine the antibody affinities compared to the mAb control (FIG. 4D; assays used a $K_D$ of 1 nM for the control mAb). It was found that the polyclonal population of antibodies produced by the mice that received the 2:10 gel vaccine had a $K_D$ of 4 nM, while the antibodies produced by the mice receiving the same vaccine in a PBS bolus had a $K_D$ of 6,000 nM, corresponding to greater than 1000-fold weaker antigen-specific binding (FIG. 4E, FIG. 4F, FIG. 13). The trends seen in the competitive binding ELISA with surface plasmon resonance (SPR) experiments were validated, showing that the 2:10 gel produced antibodies with higher affinities than the PBS group after the day 40 and 90 challenges (FIG. 14). The increase in antibody affinity observed for the 2:10 gel group suggests that the prolonged vaccine exposure with the 2:10 gel led to an enhancement of B cell affinity selection in the GCs.

Experimental Results 3—Local Inflammatory Niche within the Hydrogel Depot

Cells infiltrating the gel depots were examined to understand if the gel was creating an inflammatory niche in addition to providing sustained release of the cargo (FIG. 5A, 5B). Cell infiltration into the vaccine-loaded 2:10 gel was quantified and compared to the 2:10 gel alone 7 days after SC injection in vivo with flow cytometry. It was found that the vaccine cargo led to a greater than 5-fold increase in total cell infiltration with almost $1.0 \times 10^6$ total cells in the vaccine-loaded gels compared to $0.2 \times 10^6$ cells in the control gel (FIG. 5C). There was a diverse cell population in both the vaccine loaded gel and gel alone including neutrophils, monocytes, macrophages, dendritic cells, as well as other myeloid and non-myeloid cells (FIG. 5E). The vaccine-loaded gel did not significantly recruit more neutrophils, but did recruit significantly higher numbers of monocytes, macrophages, and dendritic cells than the empty hydrogel (FIG. 5G). Within the dendritic cell population found in the vaccine gel, the majority of the cells were migratory type 2 conventional DCs (cDC2), which play a critical role in activating follicular T helper cells (Tfh) and initiating the humoral immune response (FIG. 5d). It was also confirmed that the cDC2s were taking up antigen in the gel by including Alexa-647 conjugated OVA in the vaccine cargo and measuring cDC2 fluorescence signal with flow cytometry (FIG. 5F). The initiation of the adaptive immune response relies on signaling from APCs, therefore the abundance of APCs (i.e., macrophages and dendritic cells) in the vaccine-loaded gel at this early time point suggests that the gel acts as a beneficial inflammatory niche for immune activation.

Experimental Results 4—Germinal Center Response to Vaccination

It was hypothesized that the enhanced humoral response was due to the prolonged lifetime of GCs in the lymph nodes. GCs are dynamic sites that form after the activation of germinal center B cells (GCBCs) and are responsible for producing memory B cells and high-affinity antibodies. The GCs of the 2:10 and PBS groups after 15 days were qualitatively visualized with immunohistochemistry by staining draining lymph node sections with a GC marker (BCL6) and a non-GC B cell marker (IgD) (FIG. 6A). To quantitatively test this hypothesis, the frequency of GCBCs in the draining lymph nodes was measured 15 and 30 days after vaccination. At 15 days after vaccine administration, mice in both the 1:5 and 2:10 gel groups had significantly higher frequencies of GCBCs than the mice who received the vaccine in PBS (FIG. 6B). At 30 days post-vaccination, mice that received the 2:10 gel formulation continued to have a higher GCBC frequency (FIG. 6B). Moreover, isotype switching from IgM to IgG is critical for producing a protective humoral response. The 1:5 and 2:10 gel groups had a higher frequency of class-switched GCBCs (IgG1+) compared to the PBS group at day 15. At day 30, the percent of class-switched GCBCs remained higher for the 2:10 group in relation to the vaccine in PBS (FIG. 6C). Further, Tfh cells play a critical role in GCBC selection, class-switching and differentiation; and GCBCs interact with Tfh cells mainly in the light zone (LZ) of the GC (FIG. 6D). In agreement with the GCBC results, there was an increase in the frequency of Tfh cells in the lymph nodes of both gel groups compared to PBS at the 15 day time point (FIG. 6E). The gel groups also led to an increase in the ratio of light zone to dark zone (LZ/DZ) GCBCs compared to the PBS group (FIG. 6F). This indicates an increase in affinity selection compared to expansion and somatic hypermutation. Together, these data indicate that the prolonged vaccine exposure from the gels enhanced the magnitude and duration of the GC response.

Experimental Results 5—Influenza Model Vaccine

The platform described herein can be used for the Influenza antigen hemagglutinin (HA), which is the most commonly used antigen in Influenza subunit vaccines. Initial results showed low titers when co-administering HA with Poly(I:C) in the PNP hydrogel (FIG. 7A), so the TLR agonist resiquimod (R848), which had been previously used to elicit strong titers against HA, was evaluated. To help bolster sustained co-administration of HA and R484, which is a small molecule, R848 tethered nanoparticles were used to replace the inert nanoparticles in hydrogel network (FIG. 7B). To investigate how single administration of the influenza subunit vaccine compared to a squalene control, the antigen-specific antibody titers were quantified after immunization. Results showed that gel administration with R848 tethered NP led to a higher antibody titer.

Experimental Results 6—Treatment of Cancer

Injectable PNP hydrogels as described herein can also be used as controlled release technologies for the precise delivery of combination immunotherapies. Preliminary studies in the B16F10 model with immunotherapy-loaded hydrogel indicate that a single administration produces a significant decrease in tumor growth (p<0.0001) and a dramatic survival benefit (p<0.0001) when compared with four intratumoral bolus administrations of the same cocktail, which was indistinguishable from a PBS control (see FIG. 8).

Results also showed that PNP hydrogels can slow tumor growth for colon cancer and melanoma (see FIG. 9). The PNP hydrogels can also have additional treatment benefits, as shown in FIG. 10.

Conclusion

The description and experimental results described herein demonstrate that cargo-loaded PNP hydrogels can create a long-lived humoral immune response producing high affinity antibodies towards the vaccine antigen and/or decrease in tumor growth. The PNP hydrogels described herein can be used to create a strong and durable humoral immune response against challenging diseases, such as influenza, HIV, malaria, and cancer. The temporal profile of vaccine or immunotherapy exposure has a significant impact on the humoral response. The PNP hydrogels described herein can advantageously act on the timescales that the immune system is used to and possesses properties that improve the ease of the translation. The PNP hydrogels described here have favorable material properties and a mild synthesis approach that is scalable and versatile due to their ability to load biologic cargo by simple mixing, making them well-suited for vaccine or immunotherapy encapsulation. The cargo-loaded PNP hydrogels are injectable and retain their solid-like structure when under low stresses, enabling creation of a new stimulatory microenvironment within the body and sustained vaccine delivery. Additionally, the dynamic networks comprising the 2:10 and 1:5 gels provide unique cargo diffusion kinetics compared to covalent hydrogels.

The experimental results further imply that the 2:10 gel will release OVA and Poly(I:C) at similar rates, even though Poly(I:C) is 10 times larger than OVA, thereby ensuring co-presentation of antigen and adjuvant or other components over prolonged timeframes to the immune system. The ability of the gel to prolong the GC response in the draining lymph nodes may be the main driver for the observed enhancement in the magnitude, persistence, and quality of the humoral immune response against the antigen. Developing effective humoral immune responses towards difficult pathogens, such as HIV-1 or malaria, can requires the creation of high affinity antibodies. These antibodies are made when B cells undergo extensive somatic hypermutation in the GCs. Traditional bolus administration of vaccines may not be able to initiate robust GC responses because of mismatched antigen presentation kinetics with GC development, which occurs weeks after vaccination. The sustained release of antigen from PNP hydrogels (especially in the case of the 2:10 gel) can able to better recapitulate natural infection where GCs continuously receive antigen-derived signaling to undergo multiple rounds of selection and somatic hypermutation (FIG. 1). The prolonged antigen exposure provided by the gels drives a persistent GC response. In addition, sustained release of soluble antigen by the gel might provide GCBCs the essential B cell receptor signal, which has been shown promote DZ to LZ transition and the positive selection of high affinity GCBCs. Supporting this is the evidence that the gel groups have increased LZ/DZ ratio of GCBCs compared to the control group (FIG. 6). The significantly higher affinity antibodies produced in the mice vaccinated with 2:10 gel-based vaccines indicate an increase in somatic hypermutation and commensurate affinity maturation. It should be noted that the Keq values described herein were measured with SPR. Due to limitations in measuring dissociation times with this instrument, which can only collect dissociation data for roughly 30 min (corresponding to kd values of ~$10^{-4}$ $s^{-1}$, and thus Keq values of ~$10^8$ $M^{-1}$) before baseline drift introduces significant error into the measurement, and the polyclonal nature of the sample, the true Keq may be much higher than described herein. This hypothesis is in agreement with the competitive binding assay that revealed an over 1000-fold increase in the Keq for the 2:10 gel compared to PBS (FIG. 14). The gel also acts as a local stimulatory microenvironment where infiltrating cells experience high local concentrations of adjuvant and antigen. It is probable that the biomaterial itself has the capacity to act as an immune cell-stimulating niche which recruits and activates APCs that then migrate to the lymph nodes. Increased cell infiltration was observed with the loading of vaccine cargo into the gel, which is likely driven by the inflammatory signals initiated by Poly(I:C). The vaccine-loaded gel was able to recruit myeloid cells expressing CD11b and MHCII, which are professional APCs and are essential for initiating the adaptive immune response. It was hypothesized that these cells are activated by Poly(I:C) and migrate to the draining lymph nodes. The draining lymph nodes are therefore receiving activated immune cells from the gel as well as the soluble vaccine cargo as it is released from the gel depot over time (FIG. 1). The ability of cells to enter the PNP gel at such high quantities, without initiating a fibrotic response, is likely due to the soft and dynamic nature of this material, which allows it to slowly dissolve over the timeframe of cargo release, thus circumventing the foreign body response typical of hard, persistent biomaterials (FIG. 15).

The injectable PNP hydrogel described herein thus provides a simple and effective platform for delivery of subunit vaccines or immunotherapies to increase their potency. The PNP hydrogel allows for stabilization of immunomodulatory cargo during storage as well as proves sustained exposure of the immunotherapy or vaccine to the immune system. This enables the PNP hydrogel formulations to exploit the immune system's ability to develop a robust immune response to prolonged antigen or other component presentation, as is typical with a natural infection. The PNP hydrogel can provide for single administration of vaccines or immunotherapies that are normally administered in multiple doses, can be used as vaccines for pathogens that don't currently have a vaccine, and/or can be used as a combination immunotherapy for cancer.

The PNP hydrogel described herein can include additionally or alternatively include any of the characteristics and/or features of the hydrogels described in U.S. Publication No. 2017/0319506, the entirety of which is incorporated by reference herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   administering a vaccine delivery system to a subject, wherein the vaccine delivery system comprises:
   a hydrogel comprising a hydrophobically-modified cellulose derivative non-covalently cross-linked with a plurality of poly (ethylene glycol)-block-poly (lactic acid) (PEG-PLA) nanoparticles, wherein the hydrogel comprises about 1 wt % of the hydrophobically-modified cellulose derivative and about 5 wt % of the PEG-PLA nanoparticles;
   a first immunomodulatory cargo encapsulated in the hydrogel, the first immunomodulatory cargo comprising an immune-activating compound; and
   a second immunomodulatory cargo encapsulated in the hydrogel, the second immunomodulatory cargo comprising an antigen,
   wherein when the vaccine delivery system is administered to the subject, the hydrogel forms a depot that is configured to (1) recruit antigen-presenting cells (APCs) to infiltrate into the depot, (2) activate the infiltrating APCs with the immune-activating compound and the antigen while the infiltrating APCs are present within the depot, and (3) allow the activated infiltrating APCs to migrate out of the depot.

2. The method of claim 1, wherein the antigen comprises a protein.

3. The method of claim 1, wherein the antigen comprises a subunit vaccine antigen.

4. The method of claim 1, wherein the immune-activating compound comprises one or more of an adjuvant or a cytokine.

5. The method of claim 4, wherein the immune-activating compound comprises the adjuvant and the adjuvant comprises a toll-like receptor agonist.

6. The method of claim 1, wherein the hydrophobically-modified cellulose derivative is dodecyl-modified hydroxypropylmethylcellulose (HPMC-$C_{12}$).

7. The method of claim 1, wherein the hydrogel is shear-thinning.

8. The method of claim 1, wherein the first immunomodulatory cargo has a different molecular weight than the second immunomodulatory cargo.

9. The method of claim 8, wherein a molecular weight of the first immunomodulatory cargo is at least 5 times greater than a molecular weight of the second immunomodulatory cargo, or wherein the molecular weight of the second immunomodulatory cargo is at least 5 times greater than the molecular weight of the first immunomodulatory cargo.

10. The method of claim 1, wherein the first and second immunomodulatory cargos are released from the hydrogel at substantially the same rate after the vaccine delivery system is administered.

11. The method of claim 1, wherein the antigen is an antigen for an infectious disease or cancer.

12. The method of claim 1, wherein the vaccine delivery system is administered to the subject a single time.

13. The method of claim 1, wherein the vaccine delivery system is administered to the subject via subcutaneous injection.

14. The method of claim 1, wherein the hydrophobically-modified cellulose derivative is 5% to 30% modified with a hydrophobic moiety.

15. The method of claim 1, wherein the hydrophobically-modified cellulose derivative is 10% to 15% modified with a dodecyl moiety.

16. The method of claim 1, wherein the PEG-PLA nanoparticles have a diameter within a range from 30 nm to 50 nm.

17. The method of claim 1, wherein a ratio of a diffusivity of the first immunomodulatory cargo through the hydrogel to a self-diffusivity of the hydrogel is less than 10.

18. The method of claim 1, wherein a ratio of a diffusivity of the second immunomodulatory cargo through the hydrogel to a self-diffusivity of the hydrogel is less than 10.

19. A vaccine delivery system comprising:
   a hydrogel comprising a hydrophobically-modified cellulose derivative non-covalently cross-linked with a plurality of poly (ethylene glycol)-block-poly (lactic acid) (PEG-PLA) nanoparticles, wherein the hydrogel comprises about 1 wt % of the hydrophobically-modified cellulose derivative and about 5 wt % of the PEG-PLA nanoparticles;
   a first immunomodulatory cargo encapsulated in the hydrogel, the first immunomodulatory cargo comprising an immune-activating compound; and
   a second immunomodulatory cargo encapsulated in the hydrogel, the second immunomodulatory cargo comprising an antigen,
   wherein the hydrogel is configured to form a depot in a subject that (1) recruits antigen-presenting cells (APCs) to infiltrate into the depot, (2) activates the infiltrating APCs with the immune-activating compound and the antigen while the infiltrating APCs are present within the depot, and (3) allows the activated infiltrating APCs to migrate out of the depot.

20. The vaccine delivery system of claim 19, wherein the antigen comprises a protein.

21. The vaccine delivery system of claim 19, wherein the antigen comprises a subunit vaccine antigen.

22. The vaccine delivery system of claim 19, wherein the immune-activating compound comprises one or more of an adjuvant or a cytokine.

23. The vaccine delivery system of claim 22, wherein the immune-activating compound comprises the adjuvant and the adjuvant comprises a toll-like receptor agonist.

24. The vaccine delivery system of claim 19, wherein the hydrophobically-modified cellulose derivative is dodecyl-modified hydroxypropylmethylcellulose (HPMC-$C_{12}$).

25. The vaccine delivery system of claim 19, wherein the hydrogel is shear-thinning.

26. The vaccine delivery system of claim 19, wherein the first immunomodulatory cargo has a different molecular weight than the second immunomodulatory cargo.

27. The vaccine delivery system of claim 26, wherein a molecular weight of the first immunomodulatory cargo is at least 5 times greater than a molecular weight of the second immunomodulatory cargo, or wherein the molecular weight of the second immunomodulatory cargo is at least 5 times greater than the molecular weight of the first immunomodulatory cargo.

28. The vaccine delivery system of claim 19, wherein the first and second immunomodulatory cargos are configured to be released from the hydrogel at substantially the same rate when the vaccine delivery system is administered.

* * * * *